US008768139B2

(12) United States Patent
Raniere

(10) Patent No.: US 8,768,139 B2
(45) Date of Patent: Jul. 1, 2014

(54) SYSTEM FOR VIDEOTAPING AND RECORDING A MUSICAL GROUP

(75) Inventor: Keith A. Raniere, Clifton Park, NY (US)

(73) Assignee: First Principles, Inc., Albany, NY (US)

( * ) Notice: Subject to any disclaimer, the term of this patent is extended or adjusted under 35 U.S.C. 154(b) by 200 days.

(21) Appl. No.: 13/169,654

(22) Filed: Jun. 27, 2011

(65) Prior Publication Data

US 2012/0328260 A1 Dec. 27, 2012

(51) Int. Cl.
H04N 5/765 (2006.01)
(52) U.S. Cl.
USPC ............................................ 386/223; 725/59
(58) Field of Classification Search
USPC .................. 386/341, 200, 230, 231, 223; 348/385.1, 387.1, 14.02, 14.03, 14.09, 348/14.1, 14.11; 725/59, 78, 81
See application file for complete search history.

(56) References Cited

U.S. PATENT DOCUMENTS

| | | | |
|---|---|---|---|
| 3,761,628 A | 9/1973 | Bauer | |
| 4,419,920 A * | 12/1983 | Ohe | ................................. 84/115 |
| 5,206,842 A | 4/1993 | Spector | |
| 5,225,618 A | 7/1993 | Wadhams | |
| 5,728,960 A | 3/1998 | Sitrick | |
| 5,952,599 A | 9/1999 | Dolby et al. | |
| 6,084,168 A | 7/2000 | Sitrick | |
| 6,349,283 B1 | 2/2002 | Sanders | |
| 6,487,298 B1 | 11/2002 | Hacker | |
| 6,506,967 B1 | 1/2003 | Calello | |
| 6,631,522 B1 | 10/2003 | Erdelyi | |
| 7,511,215 B2 * | 3/2009 | Bicker | ............................. 84/645 |
| 7,599,685 B2 * | 10/2009 | Goldberg et al. | ............. 455/421 |
| 7,714,222 B2 * | 5/2010 | Taub et al. | ....................... 84/600 |
| 7,985,910 B2 * | 7/2011 | Tohgi et al. | ...................... 84/600 |
| 2002/0044158 A1 * | 4/2002 | Peyser et al. | ................... 345/700 |
| 2002/0091455 A1 | 7/2002 | Williams | |
| 2002/0144586 A1 | 10/2002 | Connick, Jr. | |
| 2003/0100965 A1 | 5/2003 | Sitrick et al. | |
| 2003/0110926 A1 | 6/2003 | Sitrick et al. | |
| 2004/0126085 A1 * | 7/2004 | Braun et al. | ..................... 386/46 |
| 2005/0129256 A1 | 6/2005 | Metcalf | |
| 2005/0265172 A1 * | 12/2005 | Stankiewicz et al. | ....... 369/47.16 |
| 2007/0273751 A1 | 11/2007 | Sachau | |
| 2008/0060506 A1 * | 3/2008 | Laycock et al. | ................. 84/645 |
| 2008/0065983 A1 | 3/2008 | Sitrick | |
| 2009/0087161 A1 * | 4/2009 | Roberts et al. | ................... 386/66 |
| 2010/0183280 A1 * | 7/2010 | Beauregard et al. | ............ 386/54 |
| 2010/0189408 A1 * | 7/2010 | Itoh | ................................. 386/52 |

(Continued)

OTHER PUBLICATIONS

International Search Report & Written Opinion; PCT/US2012/044158; International Filing Date: Jun. 26, 2012; First Principles, Inc., 12 pages.

*Primary Examiner* — David Harvey
(74) *Attorney, Agent, or Firm* — Schmeiser, Olsen & Watts, LLP

(57) ABSTRACT

A system comprising: a plurality of lead computers; a plurality of player workstations; a plurality of audio receivers and transmitters for capturing audio signals and converting said audio signals to a transmittable form, wherein at least one audio receiver and transmitter is associated with each player; a plurality of video receivers and transmitters for capturing images and converting said images to a transmittable form, wherein at least one video receiver and transmitter is associated with each player; a storage device and a processor for receiving and processing signals from said audio and video receivers and transmitters and; an output device for outputting each audio and video receiver.

20 Claims, 26 Drawing Sheets

(56) References Cited

U.S. PATENT DOCUMENTS

| | | |
|---|---|---|
| 2011/0038488 A1 | 2/2011 | Humphreys |
| 2011/0132172 A1* | 6/2011 | Gueneux .................. 84/454 |
| 2012/0123811 A1* | 5/2012 | Socolof ...................... 705/5 |
| 2013/0042746 A1* | 2/2013 | Shau ........................ 84/483.1 |
| 2013/0202265 A1* | 8/2013 | Arrasvuori et al. ......... 386/224 |
| 2013/0259450 A1* | 10/2013 | Shore ........................ 386/282 |

* cited by examiner

SYSTEM FOR VIDEOTAPING AND RECORDING A MUSICAL GROUP

FIELD OF THE TECHNOLOGY

The present invention relates generally to systems for videotaping and recording musical groups.

BACKGROUND

U.S. Pat. No. 6,506,967 to Calello provides a prerecorded musical arrangement teaching assembly and method. Prerecorded musical tracks emphasize the volume of a specific musical part such as a soprano part, an alto part, a baritone part or a bass part of a musical performance have been developed to provide musical training for singers. Musical composition systems and methods have been developed for editing the format of a musical composition using a digital pen, alphanumeric keyboard, mouse and/or musical keyboard and displaying the edited format of the musical composition to players. Player stations may be connected to a composer station in an orchestra arrangement. A handwritten recognition system may identify one or more handwritten editions in the musical composition by processing strokes of the digital pen. The handwritten editions may be converted into a digital notation format and transmitted from the composer station to one or more player stations.

U.S. Pat. No. 6,084,168 to Sitrick provides a musical composition communication system, architecture and methodology. A system controller in the form of a music stand may be used to edit the format of the musical composition, including the pitch, chords, tempo and key. Individual musical workstations may be in the form of music stands such as performer stands or conductor stands. The individual musical workstations may be linked to the system controller through a network. Edited formats of the musical composition may be transmitted from the system controller to performer stands of selected players and displayed on the performer stands of selected players.

There is a need for a system of videotaping a musical group that focuses simultaneously on each individual player in the musical group, records the musical performance of each individual player in the musical group, compiles a database of the musical performances, and allows a user to select and play back a performance of an individual player or performances of a combination of players along with the original work.

SUMMARY

A system comprising: a plurality of lead computers; a plurality of player workstations; a plurality of audio receivers and transmitters for capturing audio signals and converting said audio signals to a transmittable form, wherein at least one audio receiver and transmitter is associated with each player; a plurality of video receivers and transmitters for capturing images and converting said images to a transmittable form, wherein at least one video receiver and transmitter is associated with each player; a storage device and a processor for receiving and processing signals and to filter any distortions of sound by other players in the background from said audio and video receivers and transmitters and; an output device for outputting each audio and video receiver.

DETAILED DESCRIPTION

The present invention will be described in association with references to drawings. Various implementations of the present invention will be apparent to those skilled in the art. The present invention is a system comprising: a plurality of lead computers; a plurality of player workstations; a plurality of audio receivers and transmitters for capturing audio signals and converting said audio signals to a transmittable form, wherein at least one audio receiver and transmitter is associated with each player; a plurality of video receivers and transmitters for capturing images and converting said images to a transmittable form, wherein at least one video receiver and transmitter is associated with each player; a storage device and a processor for receiving and processing signals and to filter any distortions of sound by other players in the background from said audio and video receivers and transmitters and; an output device for outputting each audio and video receiver.

The system may be used to record the audio/or video of each player in a musical group individually while they are playing. A musical group may consist of any ensemble of musical instruments, including such examples as a rock band, jazz band, orchestra, string ensembles, wind ensembles, vocal ensembles, choirs, acapella groups, marching bands, rhythm & blues ensembles, church ensembles, ethnic ensembles, percussion ensembles, chamber music ensembles, brass ensembles, bluegrass bands, country bands, hip-hop groups, rap groups, metal groups, punk groups, swing groups, funk groups, fusion groups, techno groups and military ensembles. During playback of the musical group or individual performer, one may listen to and watch an individual performer or separate performer audio/or video signals may be combined as desired. Musical groups may mix and match various recorded instruments as they desire. Musical groups may also add in or remove various recorded instruments at any time to determine the variation they desire. Musical groups are not required to record all instruments at one given time; the system allows instruments to be added over time if desired.

Figure 1:
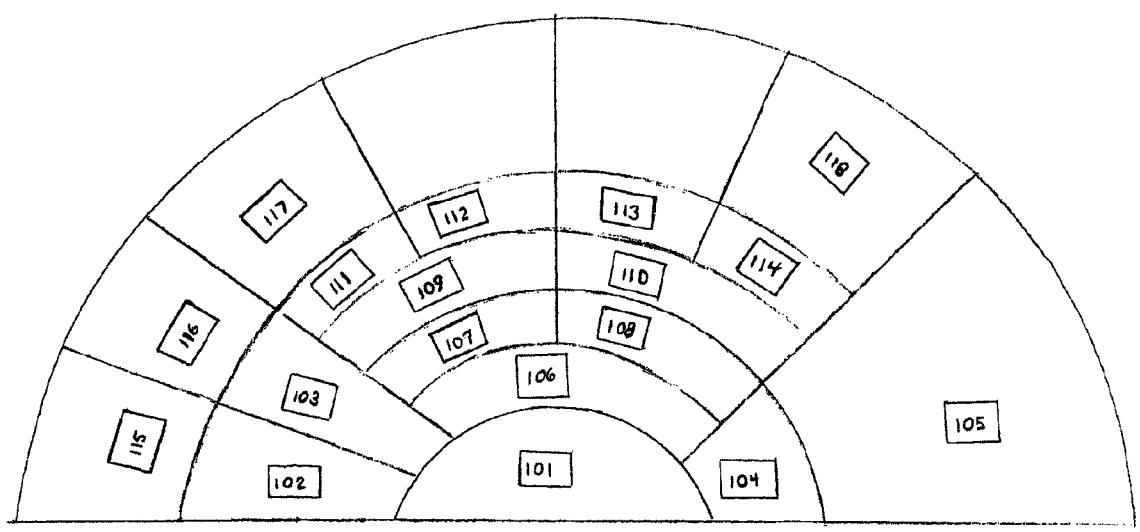
FIG. 1 illustrates a plurality of lead computers, including a conductor computer.

The system may include one or more lead computers. FIG. 1 illustrates a plurality of lead computers, including, but not limited to a conductor computer 101, a principal first violin computer 102 (i.e., a string section leader computer, a concertmaster computer), a principal second violin computer 103, a principal violoncello computer 104, a principal double bass computer 105, a principal viola computer 106, a principal flute computer 107, a principal oboe computer 108 (i.e., a woodwind section leader computer), a principal clarinet computer 109, a principal bassoon computer 110, a principal horn computer 111, a principal trumpet computer 112 (i.e., a brass section leader computer), a principal trombone computer 113 (i.e., a low-brass section leader computer), a principal tuba computer 114, a principal piano computer 115, a principal harp computer 116, a principal drum computer 117, a principal lute computer (i.e., a lutenist section leader computer), a principle vocalist computer (i.e., a vocalist section leader) and a principal timpani computer 118 (i.e., a percussion section leader computer). Alternatively, each audio and video receiver may be attached to a single computer. It should be understood that throughout the specification a computer may refer to a separate processor and storage device or single processor and storage device.

Figure 2:
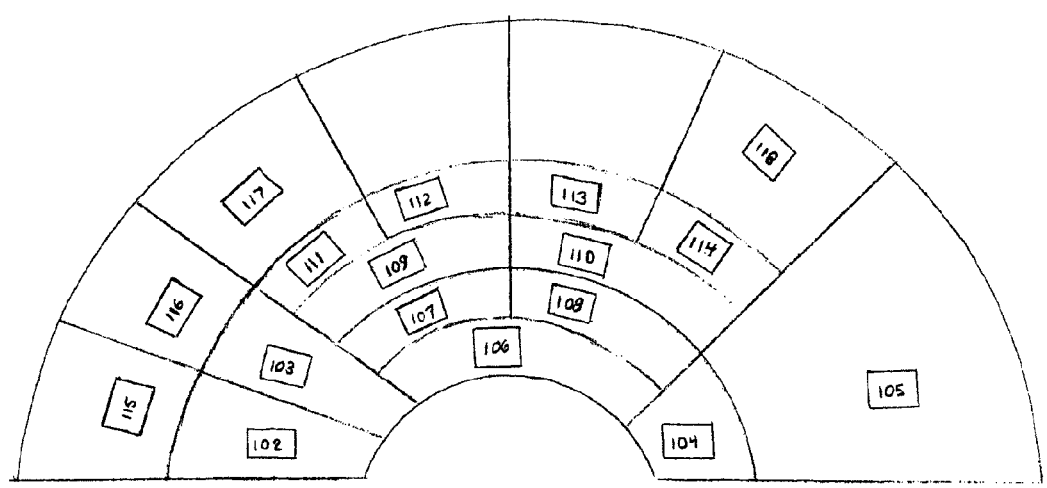
FIG. 2 provides an example of a plurality of lead computers when a concertmaster commands an orchestra.

Musical groups may perform a repertoire without a conductor. When the musical group includes a conductor, the principal first violin may act as the string section leader and concertmaster (i.e., a musical group leader); however, the principal first violin is subject to the conductor. According to FIG. 2, a principal first violin computer 102 (i.e., a string section leader computer and a concertmaster computer) or any other section leader computer may be used in place of a conductor computer 101. FIG. 2 illustrates an example of a plurality of lead computers such as a principal first violin computer 102 (i.e., a string section leader computer, a concertmaster computer), a principal second violin computer 103, a principal violoncello computer 104, a principal double bass computer 105, a principal viola computer 106, a principal flute computer 107, a principal oboe computer 108 (i.e., a woodwind section leader computer), a principal clarinet computer 109, a principal bassoon computer 110, a principal horn computer 111, a principal trumpet computer 112 (i.e., a brass section leader computer), a principal trombone computer 113 (i.e., low-brass section leader computer), a principal tuba computer 114, a principal piano computer 115, a principal harp computer 116, a principal drum computer 117, a principle lute computer (i.e., a lutenist, a guitarist section leader computer), a principle vocalist computer (i.e., a vocalist section leader) and a principal timpani computer 118 (i.e., a percussion section leader computer).

Figure 3:
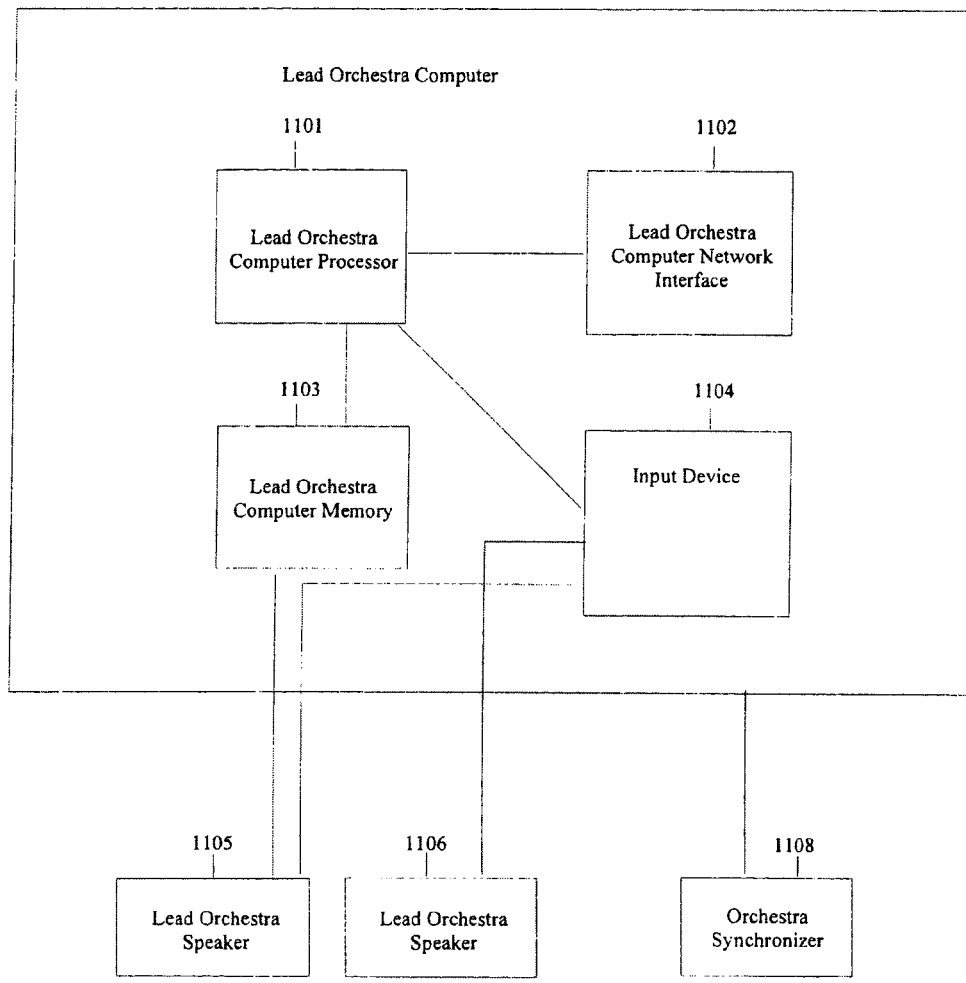
FIG. 3 illustrates a block diagram of a lead computer.

FIG. 3 illustrates is a block diagram of a lead computer (i.e., a principal drum computer, a principal bassoon computer, a principal guest computer) which includes a lead computer processor 1101 (i.e., a microprocessor), a lead computer network interface 1102, a lead computer memory 1103 and an input device 1104 (i.e., a pointer, an alphanumeric keyboard, a stylus, a mouse, a cursor, a trackball, a touch sensitive screen, a touch panel, a touch pad, a pressure-sensitive pad, a light pen, other graphical user interface (GUI) or combination thereof). The lead computer processor 1101 is connected to the lead memory 1103. The lead computer processor 1101 is also connected to the input device 1104. The lead computer network interface 1102 is a means for communicating with other lead computers and player workstations. The lead computer receives data from other lead computers and/or player workstations via the lead computer network interface 1102. The lead computer also sends data to other lead computers and/or player workstations via the lead computer network interface 1102. A name of a musical group leader and a musical composition may be configured in a corresponding lead computer using the input device 1104.

Figure 4:
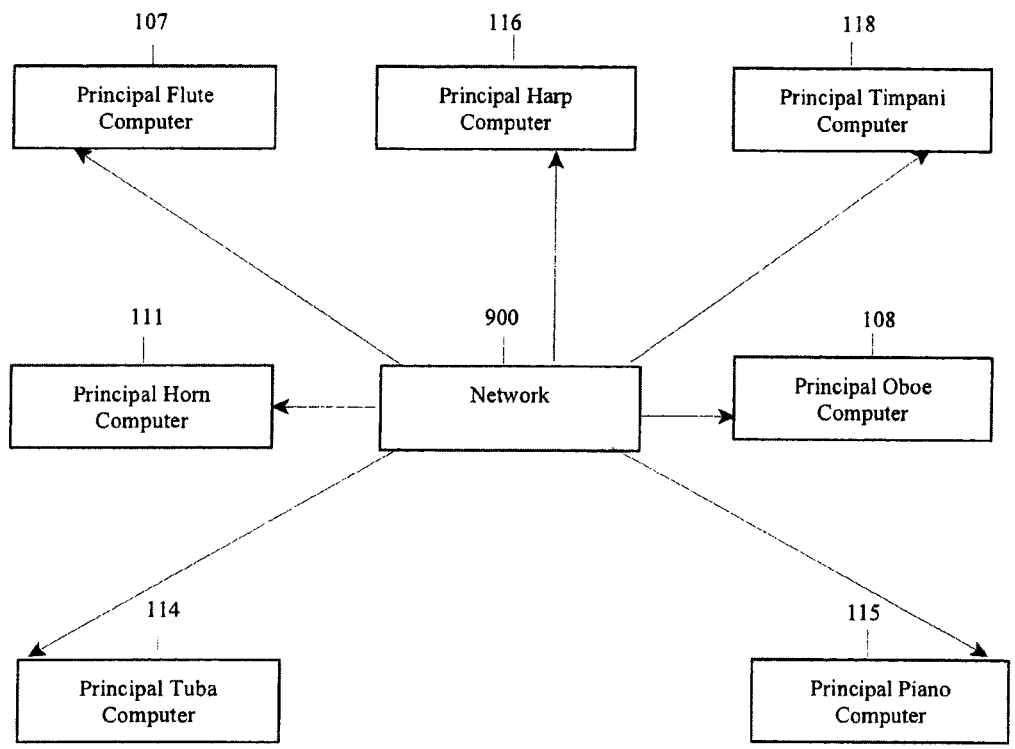
FIG. 4 shows an example the linking of a conductor computer to other lead computers.

A plurality of lead computers may be linked using a network (i.e., Internet, Intranet or Ethernet via a network card, telephone line, cordless telephone line, cable modem and/or wireless device). FIG. 4 illustrates an example in which a plurality of lead computers such as a principal flute computer 107, a principal oboe computer 108, a principal horn computer 111, a principal tuba computer 114, a principal piano computer 116 and a principal timpani computer 118 are connected via a network 900.

Figure 5:
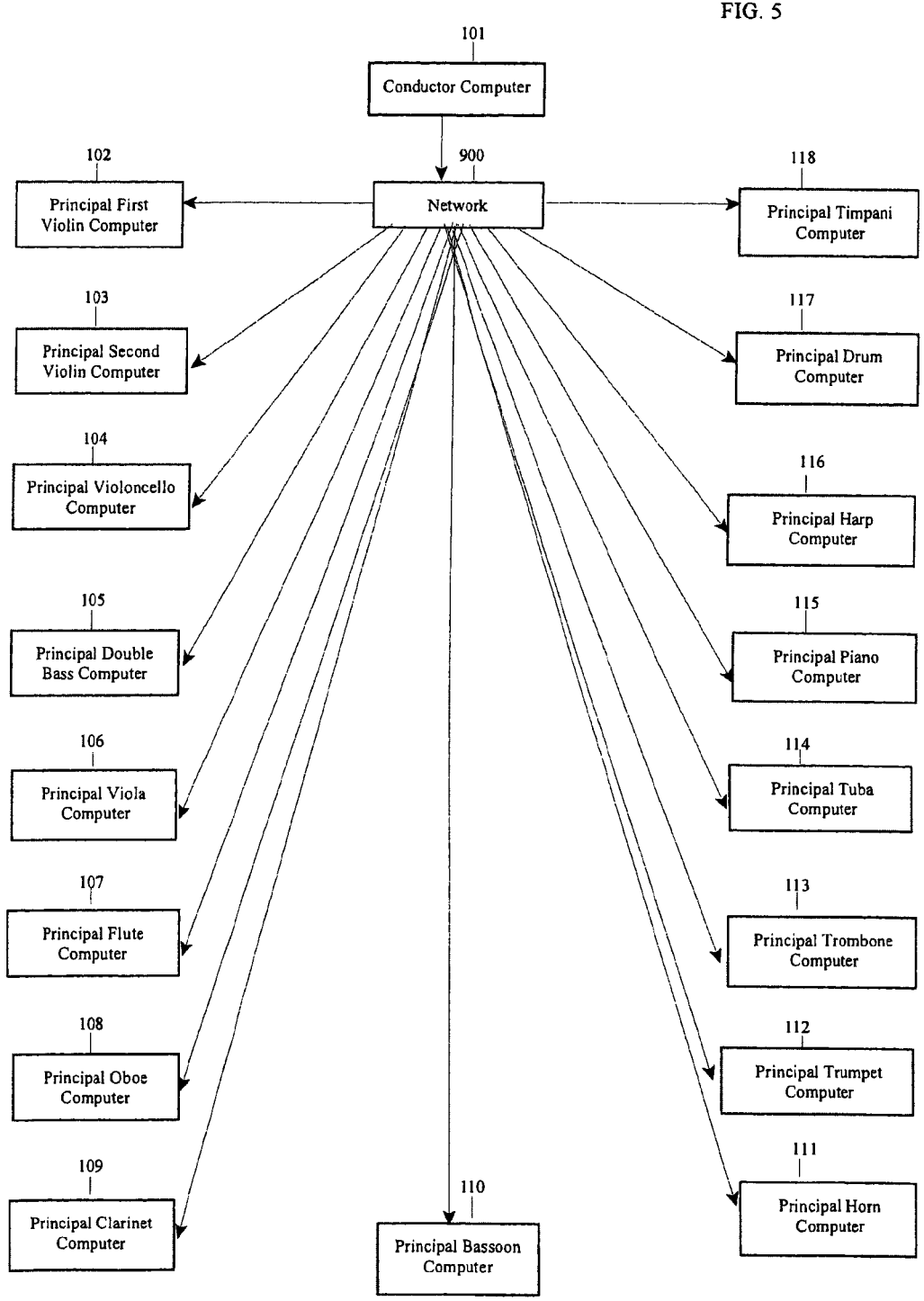
FIG. 5 shows an example in which a conductor computer 101 is linked to other lead computers.
Figure 5A:
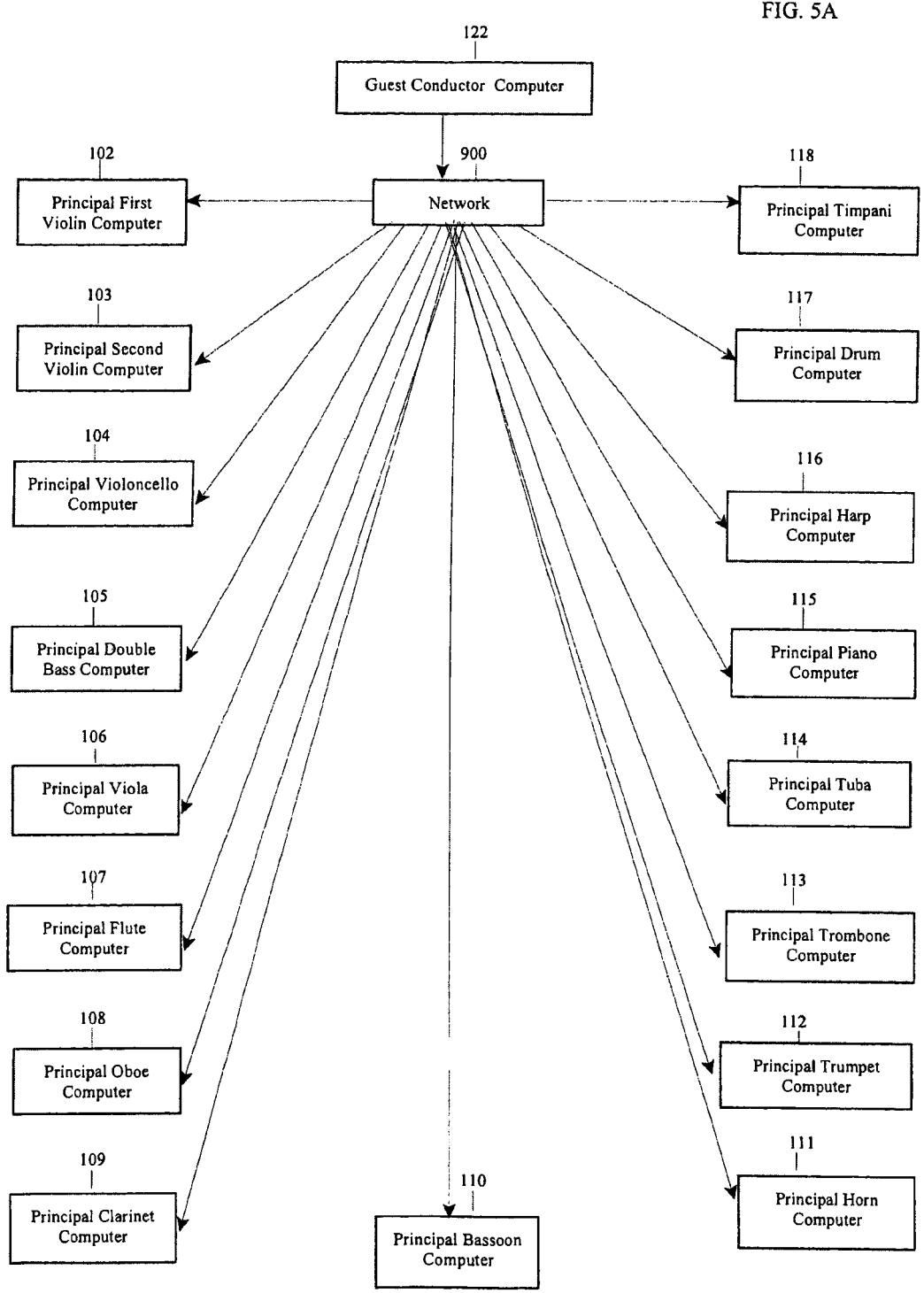
Figure 6:
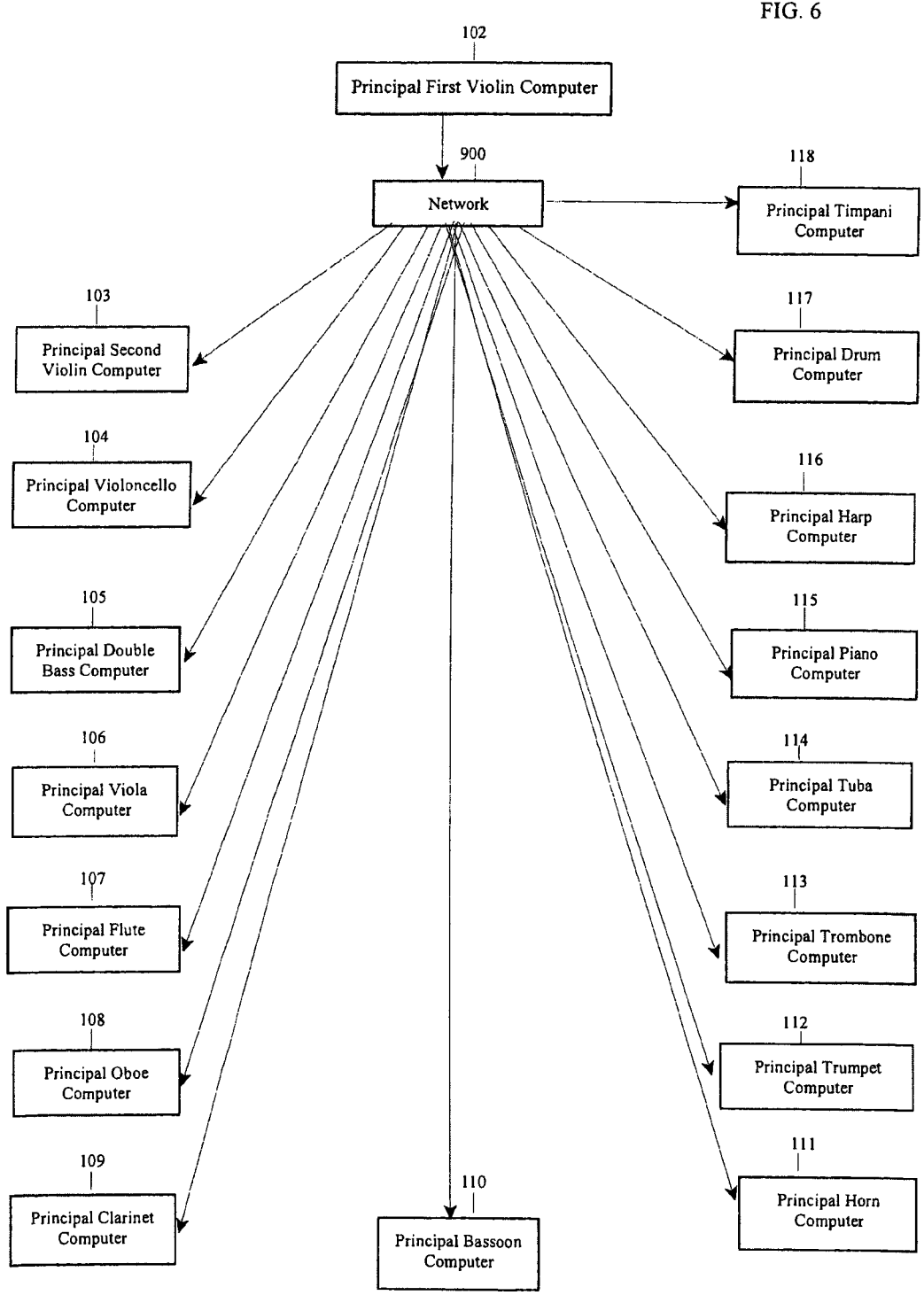
FIG. 6 illustrates an example of the linking of a principal first violin computer to other lead computers where musical group performs without a conductor.

FIG. 5 shows an example in which a conductor computer 101 linked via a network 900 to other lead computers such as a principal first violin computer 102 (i.e., a string section leader computer, a concertmaster computer), a principal second violin computer 103, a principal violoncello computer 104, a principal double bass computer 105, a principal viola computer 106, a principal flute computer 107, a principal oboe computer 108 (i.e., a woodwind section leader computer), a principal clarinet computer 109, a principal bassoon computer 110, a principal horn computer 111, a principal trumpet computer 112 (i.e., a brass section leader computer), a principal trombone computer 113 (i.e., low-brass section leader computer), a principal tuba computer 114, a principal piano computer 115, a principal harp computer 116, a principal drum computer 117, a principal lute computer (i.e., a lutenist section leader computer), a principle vocalist computer (i.e., a vocalist section leader computer), and a principal timpani computer 118 (i.e., a percussion section leader computer). Alternatively, a guest conductor computer may be linked to other lead computers via a network 900. FIG. 5 shows an example of the linking of the conductor computer 101 to other lead computers using the network 900. FIG. 6 provides an example of the linking of a principal first violin computer to other lead computers where a musical group performs without a conductor.

Figure 7:
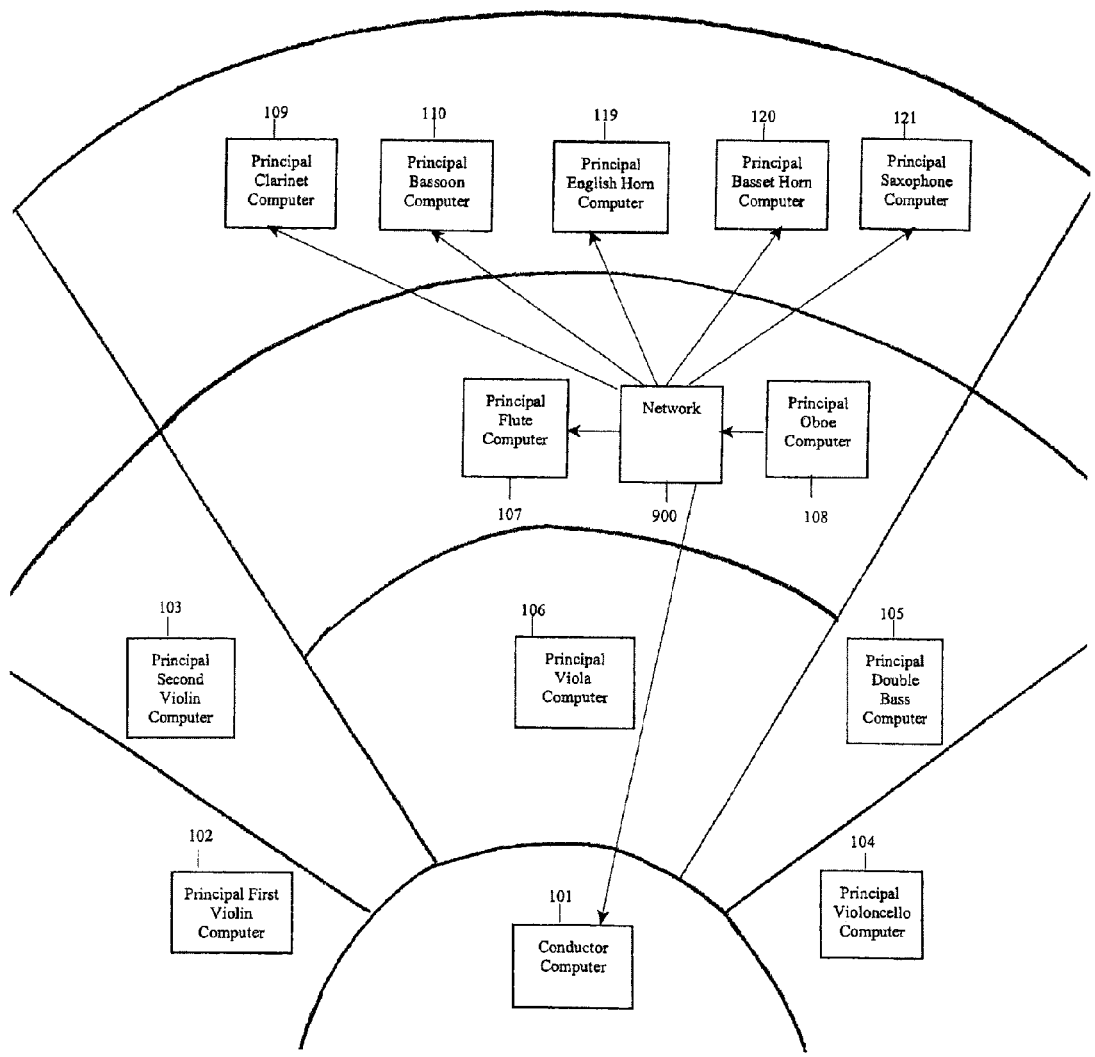
FIG. 7 illustrates an example of the linking of a principal oboe computer to lead computers.

FIG. 7 illustrates an example of a principal oboe computer linked via a network 900 to lead computers, including a conductor computer 101, a principal clarinet computer 109, a principal bassoon computer 110, a principal English horn computer 119, a principal basset horn computer 120 and principal saxophone computer 121.

Figure 8:
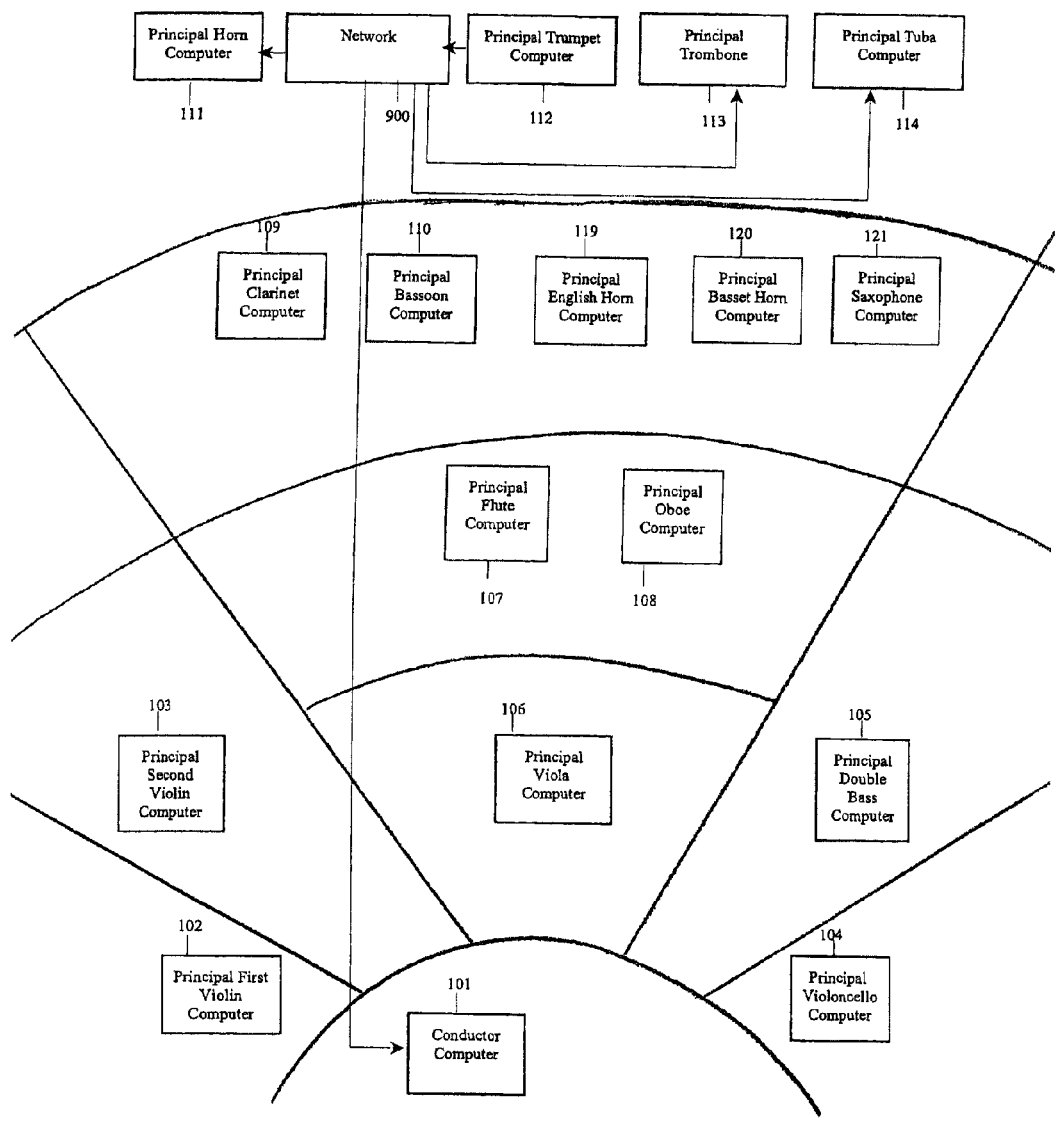
FIG. 8 provides an example of the linking of a principal trumpet computer to lead computers such as a conductor computer, a principal horn computer, a principal trombone computer and a principal tuba computer.

A principal trumpet computer 112 (i.e., a brass section leader computer) may be linked via a network 900 to lead computers such as a conductor computer 101, a principal horn computer 111, a principal trombone computer 113 and/or a principal tuba computer 114 in accordance with FIG. 8.

A plurality of player workstations may include string player workstations, woodwind player workstations, brass player workstations, percussion player workstations, lute player workstations, vocalist player workstation or a combination thereof. In accordance with FIG. 9, examples of a player workstation include, but are not limited to a first violin player workstation 201, a second violin player workstation 202, a viola player workstation 203, a violoncello player workstation 204, a double bass player workstation 205, a lute player workstation 206, a zither player workstation 207 and a harp player workstation 208, a flute player workstation 301, an oboe player workstation 302, a Cor anglais player workstation 303 (i.e., English horn player workstation), a clarinet player workstation 304, a basset horn player workstation 305, a bassoon player workstation 306, a saxophone player workstation 307, a trumpet player workstation 401, a cornet player workstation 402, a trombone player workstation 403, a tuba player workstation 404, a contrabass tuba player workstation 405, a horn player workstation 406, a drum player workstation 501, a cymbal player workstation 502, a castanet player workstation 503, a gong player workstation 504, an orchestra bell player workstation 505, a tambourine player workstation 506, a maraca's player workstation 507, a guiro player workstation 508, a timpani player workstation 509, a xylophone player workstation 510, a metallophone player workstation 511, a marimba player workstation 512, a marimba-xylophone player workstation 513, a chime's player workstation 514, a piano player workstation 515, a harpsichord player workstation 516 and an organ player workstation 517.

Figure 10:
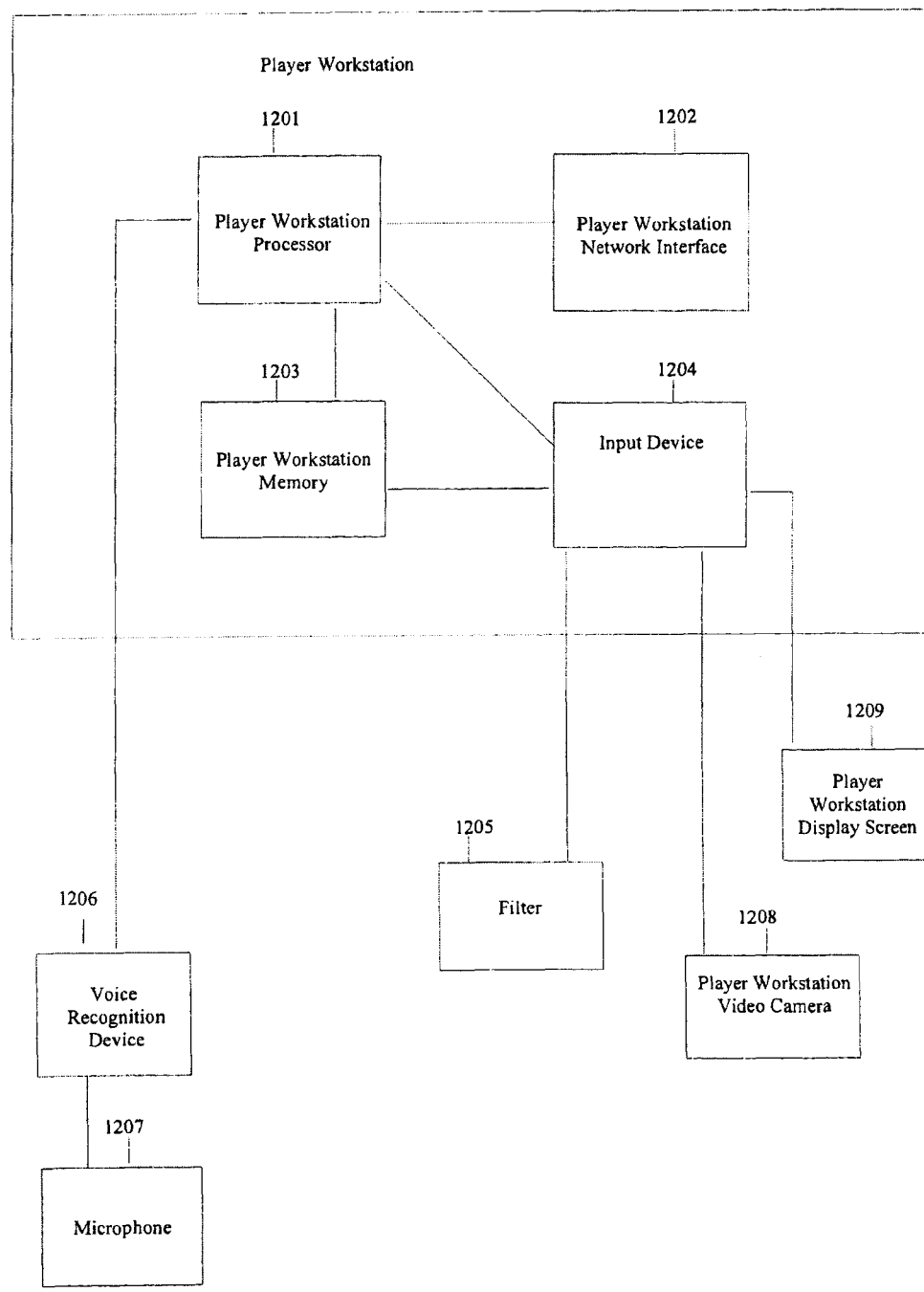
FIG. 10 illustrates a block diagram of a player workstation.

FIG. 10 illustrates a block diagram of a player workstation (i.e., a first violin player workstation, a flute player workstation, a trumpet player workstation, a lute player workstation, a drum player workstation, a vocalist player workstation). A name of an individual player (i.e., Harry Steinbach, Julia Baker, Gertrude Taylor) and a repertoire (i.e., concertos, solo concertos, symphonies, sonatas, compositions, collection of musical pieces) for the musical instrument may be entered into the corresponding player workstation using a player workstation input device 1204.

Each player workstation focuses on a performance of an individual player during a live musical performance. Alternatively, a single computer may receive input data from the audio and video receiver from each player and record and store the data. Each player workstation or a single computer includes a filter 1205 for reducing signals from other player workstations and background sounds. The performance of the individual player may be videotaped using a player workstation video camera 1208 and computer-aided design software or computer aided manufacturing software. Each player workstation or a single computer may comprise one or more player workstation input devices 1204 (i.e., a graphical user interface, a touch-sensitive screen, an alphanumeric keyboard, a mouse, a radio button), which are linked to a player workstation processor 1201. Each player workstation includes a microphone 1207 for each individual player. A voice recognition device 1206 receives input from the microphone 1207. A videotaped performance of each individual player may be stored in the player workstation memory 1203 of the corresponding player workstation or each section of a single computer.

A workstation display screen 1209 displays the videotaped performance of at least one individual player. For example, the workstation display screen 1209 may be in the form of a liquid crystal display (LCD). Another example of a player workstation display screen is an active matrix liquid crystal display (AMLCD). The player workstation display screen 1209 may be in the form of a cathode ray tube (CRT). Yet another example of a player workstation display screen 1209 is a plasma display panel (PDP). The display screen may be in the form of digital light processing (DLP). Yet another possibility is light-emitting diode display (LED). The player workstation display screen 1209 may be in the form of a television screen or a computer monitor. A hand-held (HHC) computer provides an example of a player workstation display screen 1209. A personal digital assistant (PDA) may be used as a player workstation display screen 1209. A tablet PC or cell phone may also be used as a player workstation display screen 1209. Other examples of a player workstation display screen 1209 include, but are not limited to a field emission display (FED) and an electro luminescent display (EL).

The player workstation may act as a training tool for individual members of the musical group allowing them to observe and listen to their own audio and/or video as well as audio and/or video signals from other members of the musical group. The player workstation may aid the musical group members in identifying mistakes or experimentation with different arrays of musical instruments.

Figure 9:
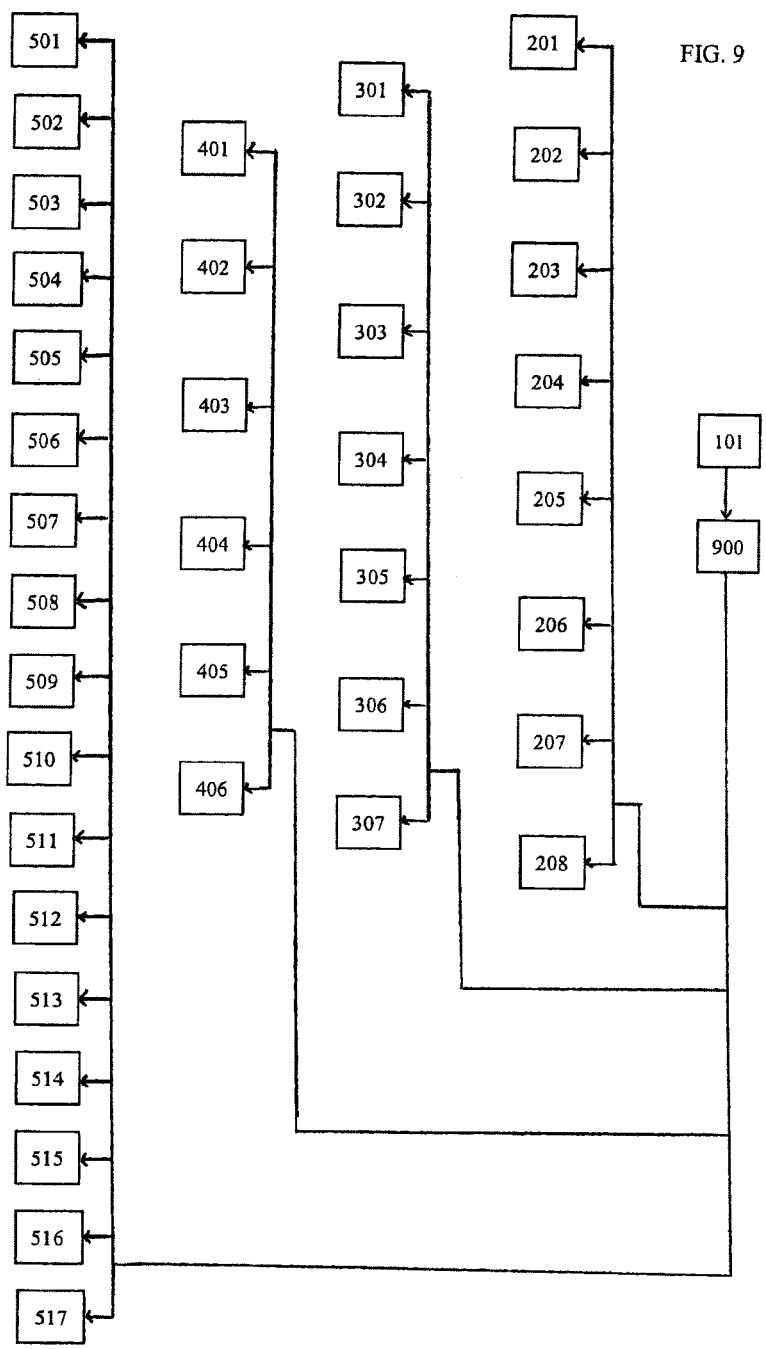
FIG. 9 illustrates examples of a player workstation.

At least one lead computer may be connected to a plurality of player workstations (i.e., one or more string player workstations, woodwind player workstations, percussion player workstations, brass player workstations and/or combination thereof) using a network 900 (i.e., Internet, Intranet or Ethernet via a network card, telephone line, cordless telephone line, cable modem and/or wireless device). FIG. 9 illustrates a lead computer such as a conductor computer 101 linked to a plurality of player workstations of individual players using a network 900.

Figure 11:
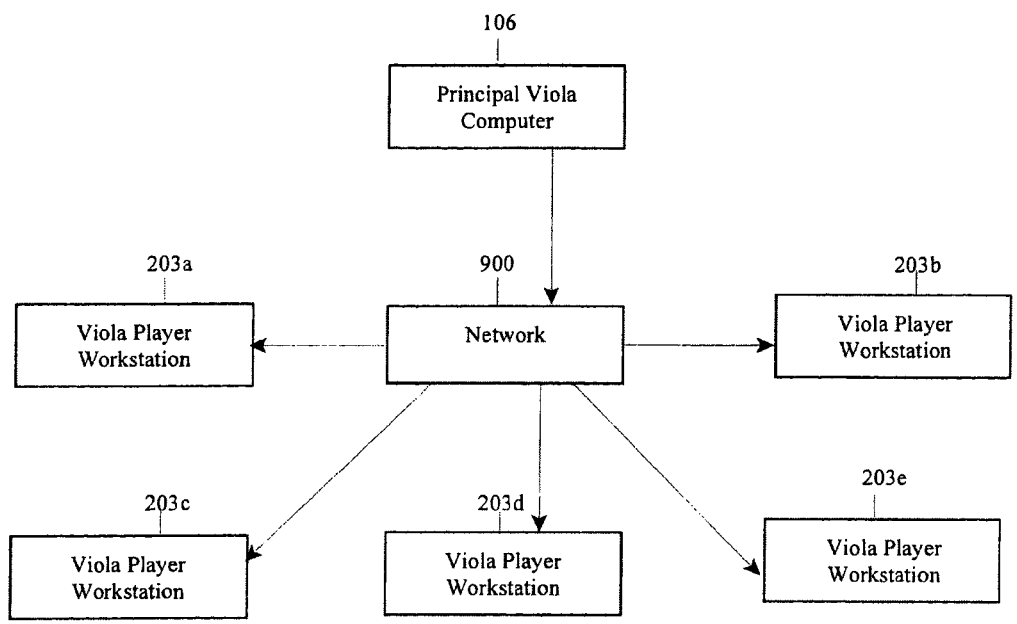
FIG. 11 shows a principal viola computer linked to viola player workstation.
Figure 12:
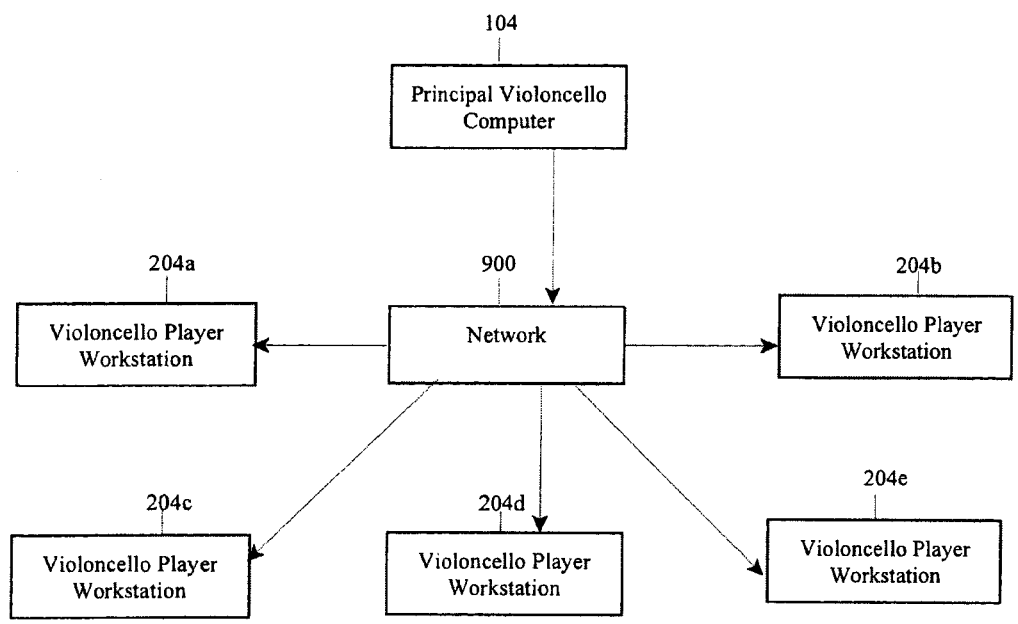
FIG. 12 illustrates an example of the linking of a plurality of violoncello player workstations to a principal violoncello computer.
Figure 13:
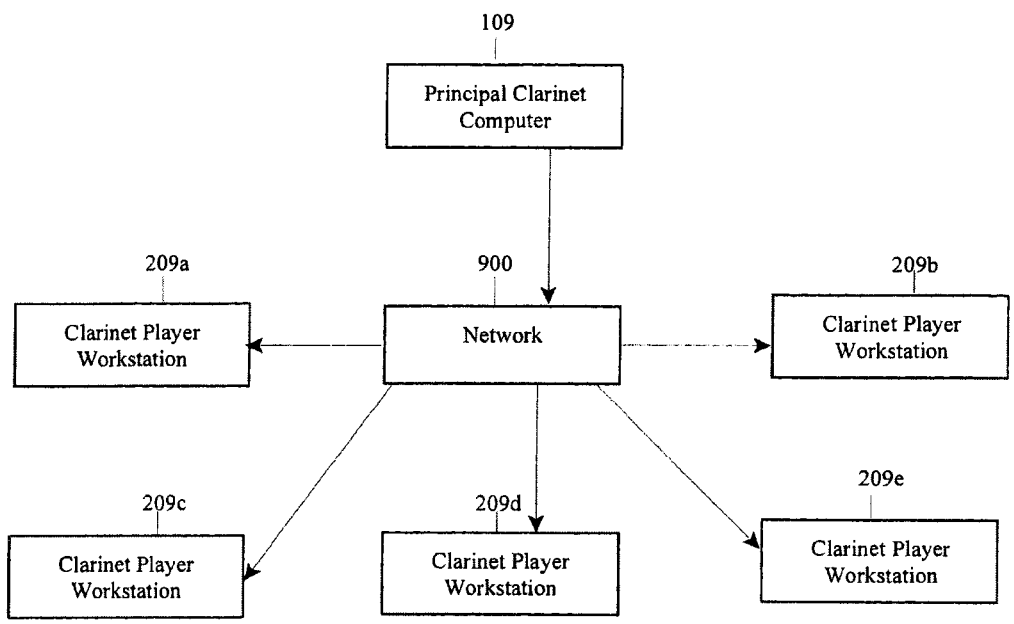
FIG. 13 provides an example of the linking of a principal clarinet computer to a plurality of clarinet player workstations using a network 900.
Figure 14:
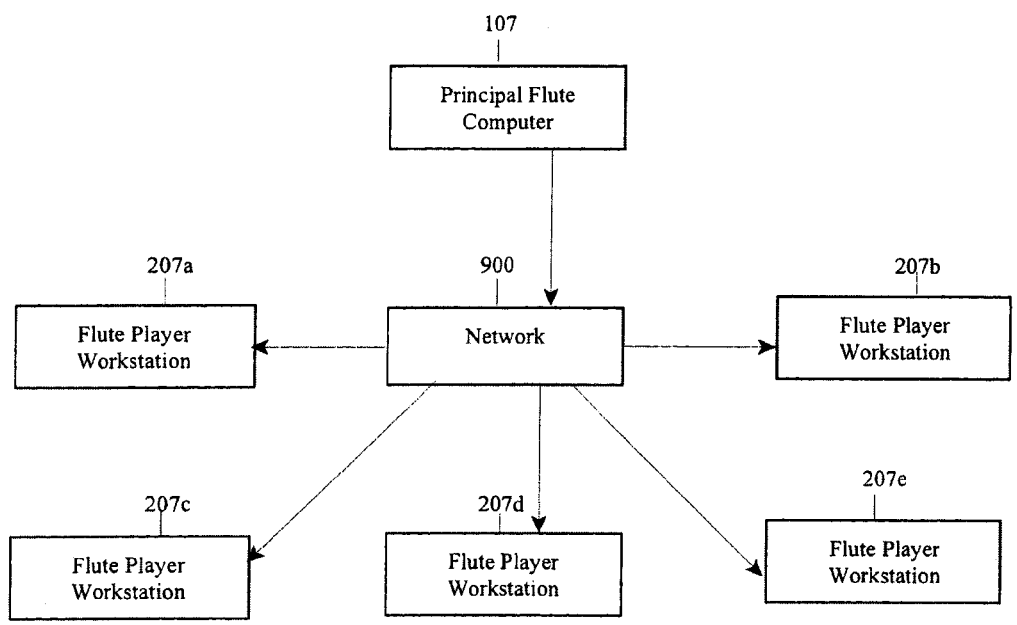
FIG. 14 provides an example of a principal flute computer linked to a plurality of flute player workstations.

FIG. 11 shows a principal viola computer 106 linked to a plurality of viola player workstations 203a, 203b, 203c, 203d and 203e using a network 900. In FIG.12, a principal violoncello computer 104 is linked to a plurality of violoncello player workstations 204a, 204b, 204c, 204d and 204e via a network 900. Further, FIG. 13 provides an example of the linking of a principal clarinet computer 109 to a plurality of clarinet player workstations 209a, 209b, 209c, 209d and 209e using a network 900. Similarly, FIG.14 provides an example of a principal flute computer 107 linked to a plurality of flute player workstations 207a, 207b, 207c, 207d and 207e.

Figure 15:
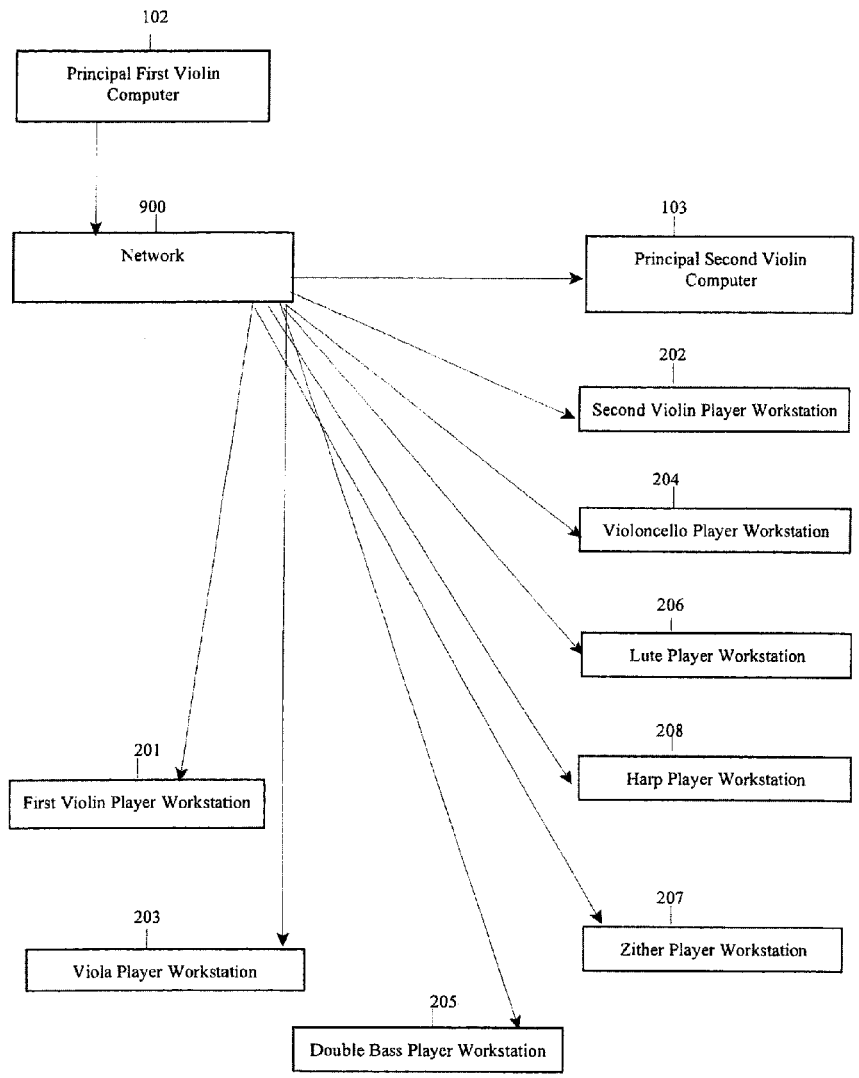
FIG. 15 is a diagram of a principal first violin computer to a plurality of string player workstations.

In accordance with FIG. 15, a principal first violin computer 102 (i.e., a string section leader computer) may be linked to a plurality of string player workstations, including but is not limited to a first violin player workstation 201, a second violin player workstation 202, a viol player workstation 203, a violoncello player workstation 204, a double bass player workstation 205, a lute player workstation 206, a zither player workstation 207 and a harp player workstation 208.

Figure 16:
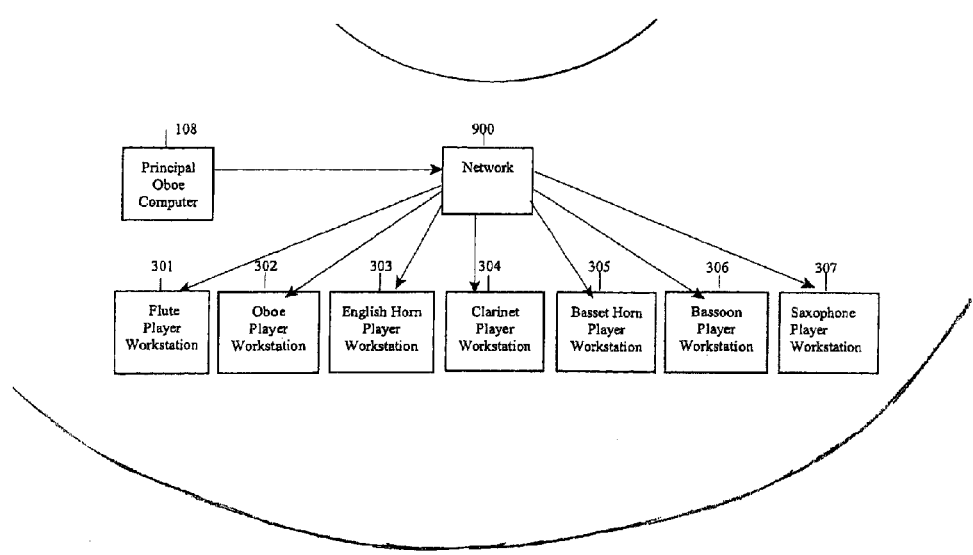
FIG. 16 illustrates an example of the linking of a principal oboe computer to a flute player workstation, an oboe player workstation, an English Horn player workstation, a clarinet player workstation, a basset horn player workstation, a bassoon player workstation and a saxophone player workstation.

A principal oboe computer (i.e., a woodwind section leader computer) may be linked to a plurality of player workstations such as a plurality of woodwind player workstations, including flute player workstations, oboe player workstations, English Horn player workstations, a clarinet player workstations, basset horn player workstations, bassoon player workstations and/or saxophone player workstations. FIG. 16 illustrates an example of the linking of the principal oboe computer 108 to a flute player workstation 301, an oboe player workstation 302, an English Horn player workstation 303, a clarinet player workstation 304, a basset horn player workstation 305, a bassoon player workstation 306 and/or a saxophone workstation 307.

Figure 17:
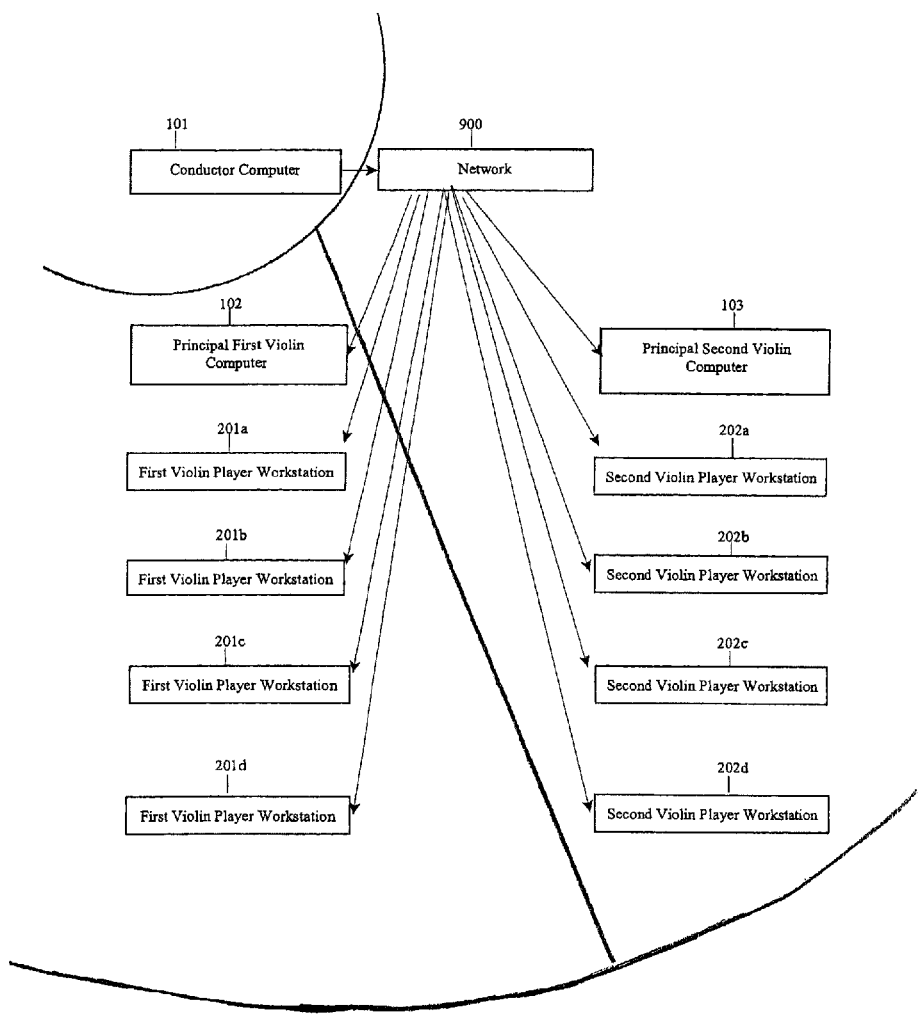
FIG. 17 illustrates an example of the linking of a conductor computer to a principal first violin computer, a principal second violin computer, a plurality of first violin player workstations and a plurality of second violin workstations.

A plurality of lead computers and a plurality of player workstations may be linked using a network (i.e., Internet, Intranet or Ethernet via a network card, telephone line, cordless telephone line, cable modem and/or wireless device). FIG. 17 illustrates an example of a conductor computer linked to a principal first violin computer, a principal second violin computer, a plurality of first violin player workstations and a plurality of second violin workstations.

Figure 18:
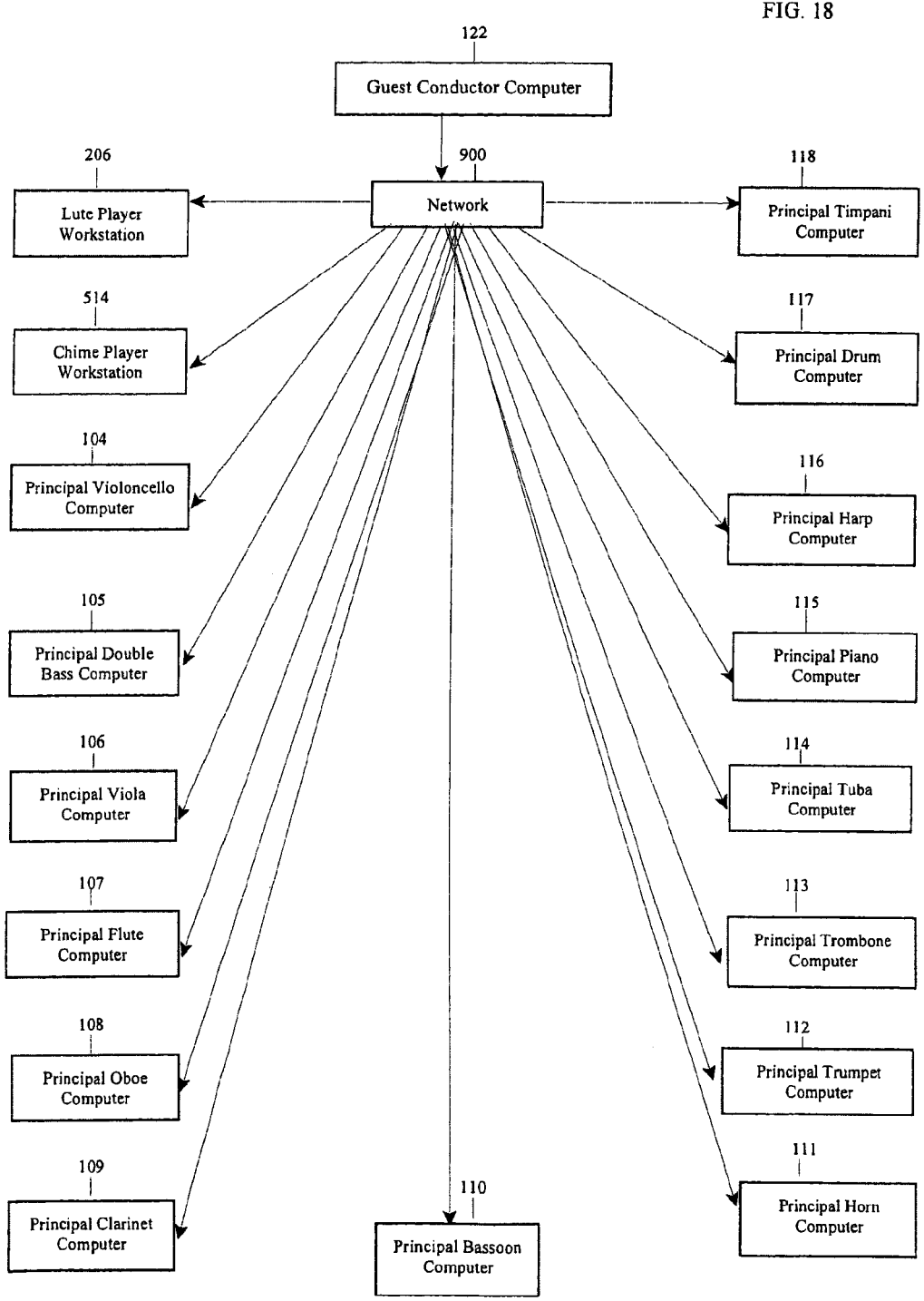
FIG. 18 illustrates an example of a guest conductor computer linked to other lead computers.

FIG. 18 illustrates an example of a guest conductor computer 122 linked to other lead computers (i.e., a principal violoncello computer 104, a principal double bass computer 105, a principal viola computer 106, a principal flute computer 107, a principal oboe computer 108, a principal clarinet computer 109, a principal bassoon computer 110, a principal horn computer 111, a principal trumpet computer 112, a principal trombone computer 113, a principal tuba computer 114, a principal piano computer 115, a principal harp computer 116, a principal drum computer 117 and a principal timpani computer 118 and a plurality of player workstations (i.e., one or more lute player workstations 206, one or more chimes player workstations 514).

Figure 19:
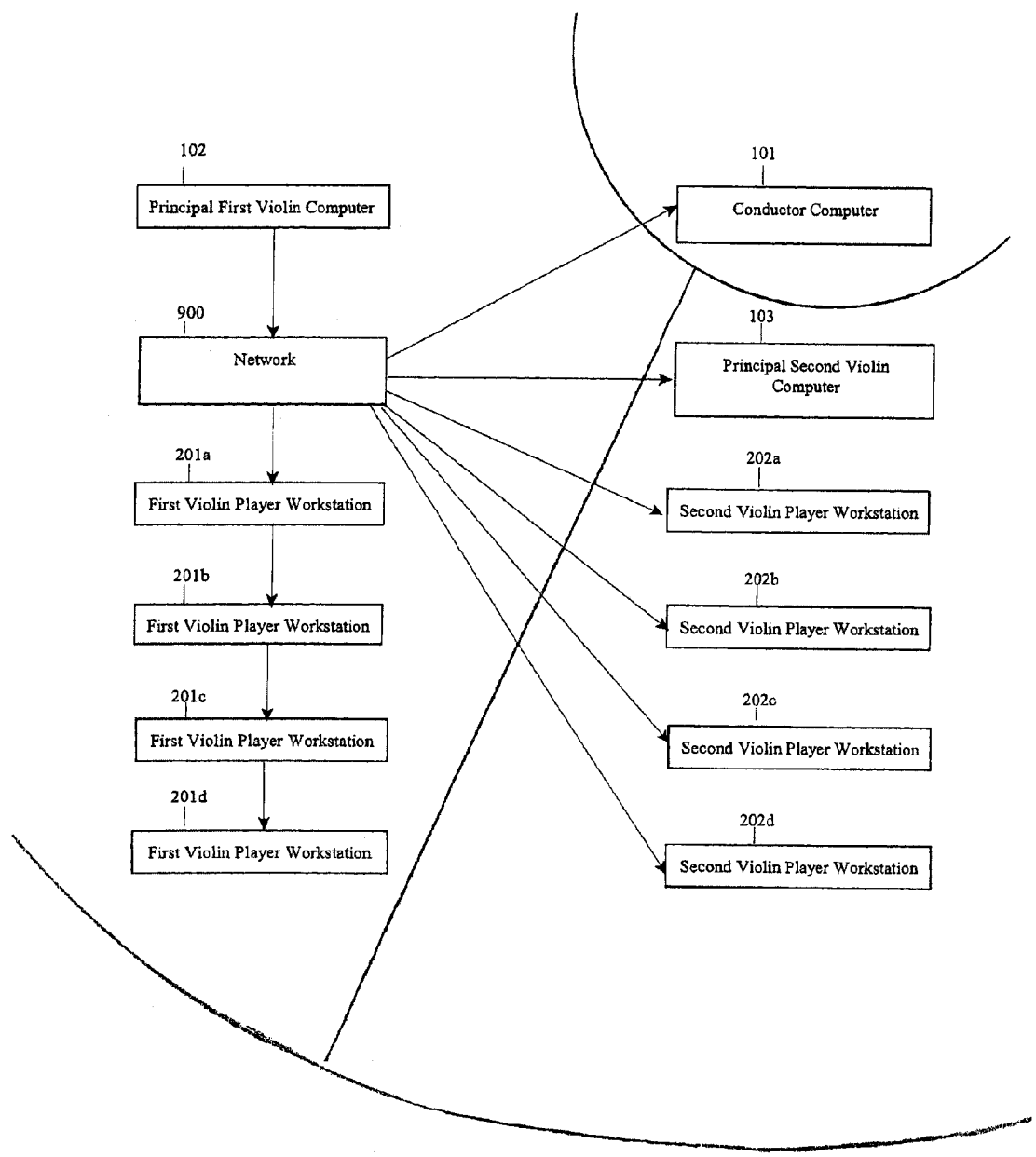
FIG. 19 provides an example of a principal first violin computer linked to a plurality of first violin player workstations and a plurality of second violin player workstations.
Figure 20:
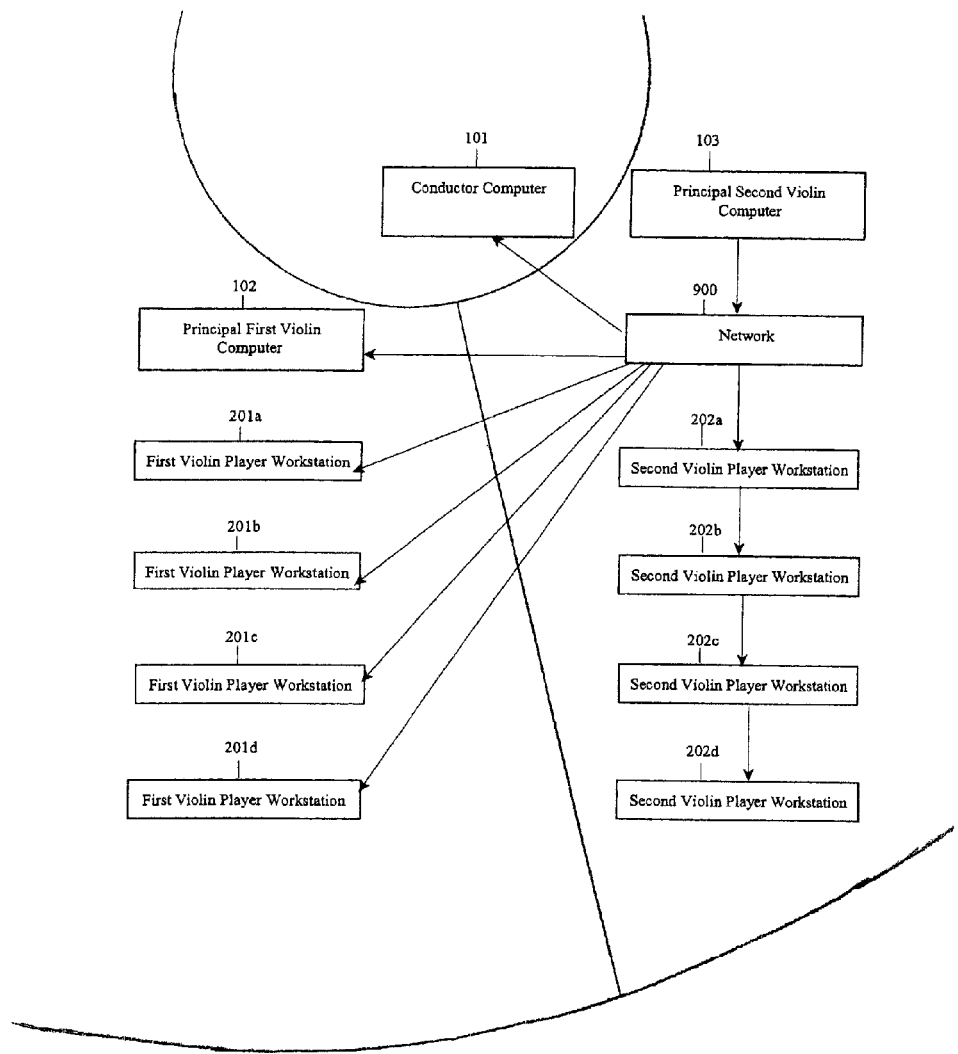
FIG. 20 depicts an example of the linking of a principal second violin computer to a conductor computer, a principal first violin computer, a plurality of first violin player workstations and a plurality of second violin player workstations.

FIG. 19 provides an example of a principal first violin computer 102 (i.e., a string section leader computer, a concertmaster computer) linked to a plurality of first violin player workstations 201a, 201b, 201c, 201d and a plurality of second violin player workstations 202a, 202b, 202c, 202d. The principal first violin computer 102 may be also linked to a conductor computer 101. In accordance with FIG. 20, the principal second violin computer 103 may be linked to a conductor computer 101, a principal first violin computer 102, a plurality of first violin player workstations 201a, 201b, 201c, 201d and a plurality of second violin player workstations 202a, 202b, 202c, 202d.

Figure 21:
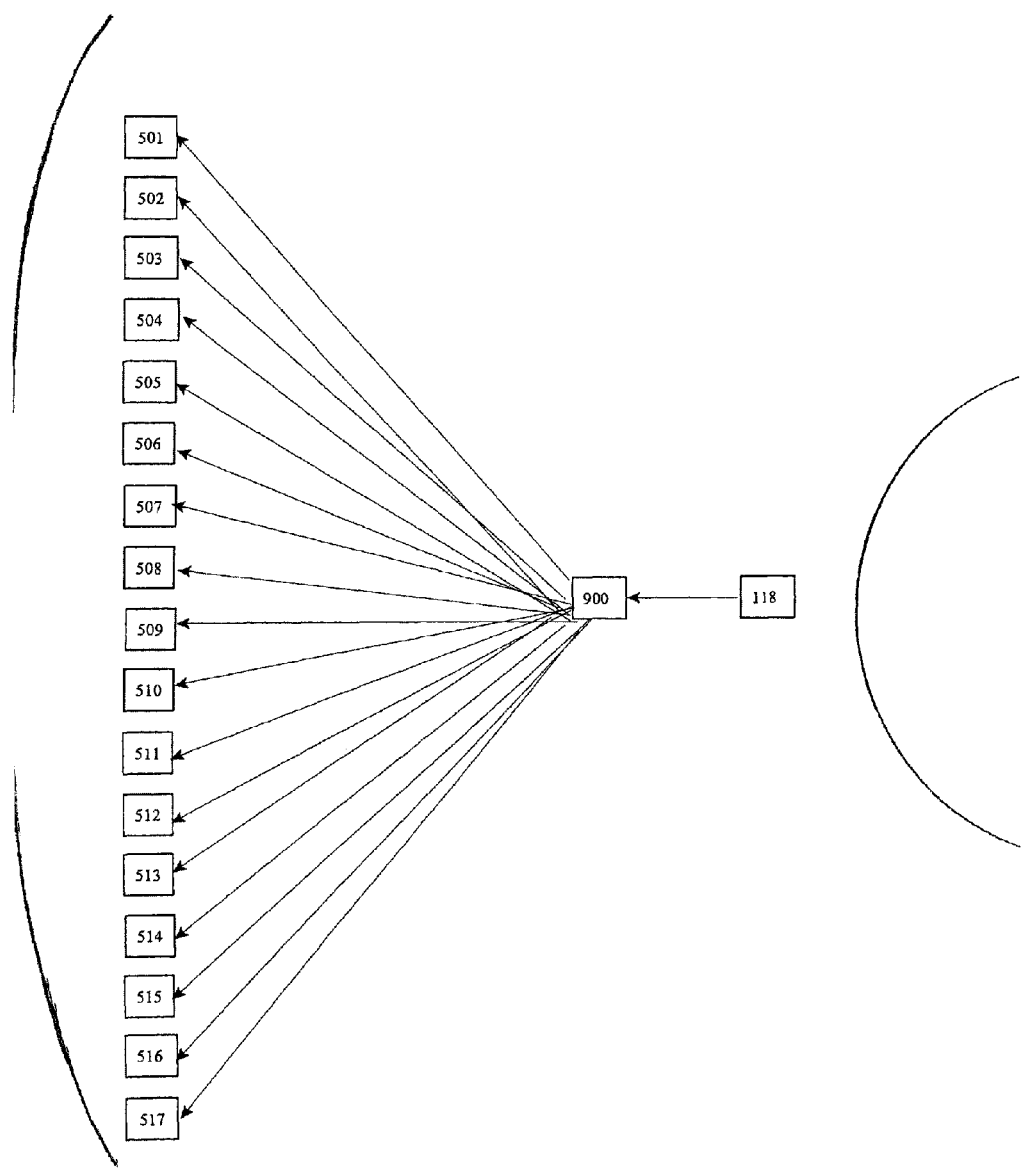
FIG. 21 shows a principal timpani computer linked to a plurality of percussion player workstations.

FIG. 21 shows a principal timpani computer 118 (i.e., a percussion section leader computer) linked to a plurality of percussion player workstations, including a drum player workstation 501, a cymbal player workstation 502, a castanet player workstation 503, a gong player workstation 504, an orchestra bell player workstation 505, a tambourine player workstation 506, a maraca player workstation 507, a guiro player workstation 508, a timpani player workstation 509, a xylophone player workstation 510, a metallophone player workstation 511, a marimba player workstation 512, a marimba-xylophone player workstation 513, a chime player workstation 514, a piano player workstation 515, a harpsichord player workstation 516 and an organ player workstation 517.

Figure 22:
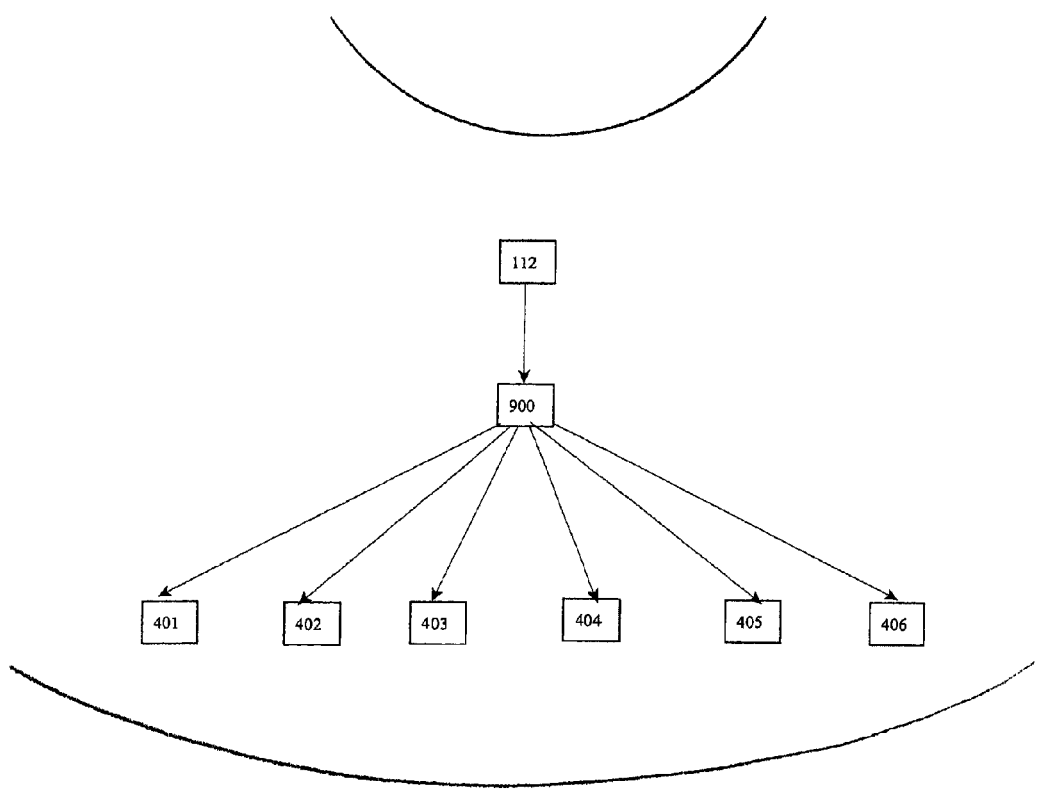
FIG. 22 illustrates a principal trumpet computer linked to a plurality of brass player workstations.
Figure 23:
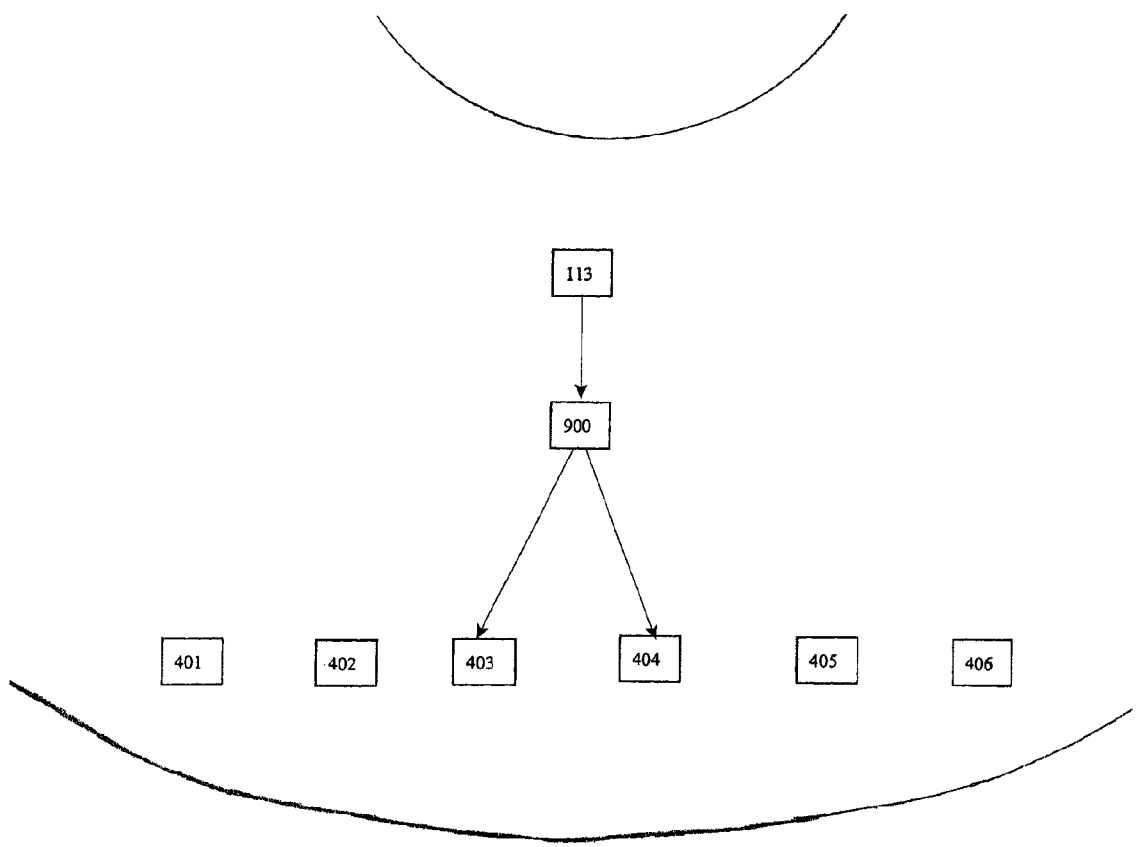
FIG. 23 depicts an example of the linking of a principal trombone computer to a trombone player workstation and a tuba player workstation.

FIG. 22 illustrates a principal trumpet computer 112 linked to one or more brass player workstations, including a trumpet player workstation 401, a cornet player workstation 402, a trombone player workstation 403, a tuba player workstation 404, a contrabass tuba player workstation 405 and a horn player workstation 406. FIG. 23 illustrates the linking of a principal trombone computer 113 to a trombone player workstation 403 and a tuba player workstation 404.

Figure 24:
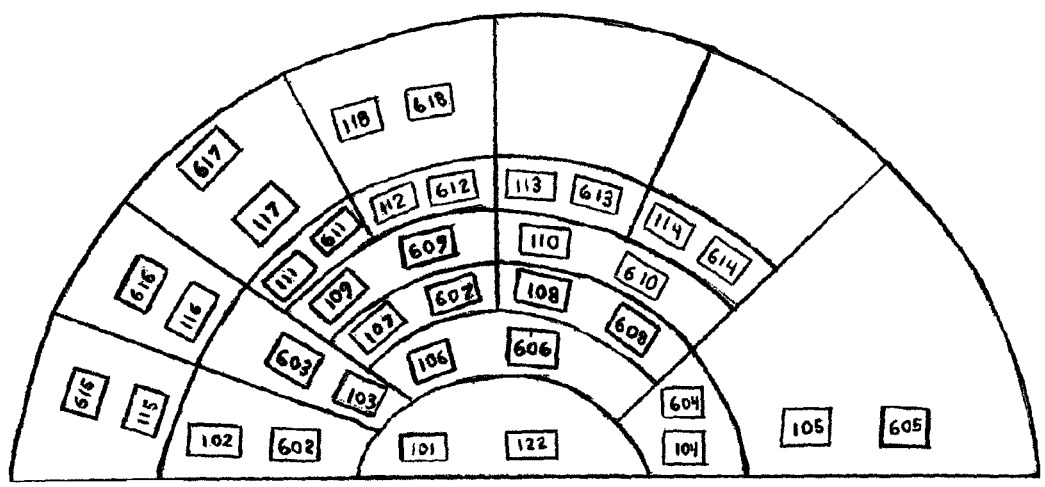
FIG. 24 illustrates a preferred embodiment of the system for videotaping a musical group.

In a preferred embodiment of FIG. 24, a plurality of lead computers includes a conductor computer 101, a guest conductor computer 122, a principal first violin computer 102 (i.e., a string section leader computer, a concertmaster computer), an assistant first violin computer 602, a principal second violin computer 103, an assistant principal second violin computer 603, a principal violoncello computer 104, an assistant principal violoncello computer 604, a principal double bass computer 105, an assistant double bass computer 605, a principal viola computer 106, an assistant principal viola computer 606, a principal flute computer 107, an assistant flute computer 607, a principal oboe computer 108 (i.e., a woodwind section leader computer), an assistant principal oboe computer 608, a principal clarinet computer 109, an assistant principal clarinet computer 609, a principal bassoon computer 110, an assistant principal bassoon computer 610, a principal horn computer 111, an assistant principal horn computer 611, a principal trumpet computer 112 (i.e., a brass section leader computer), an assistant principal trumpet computer 612, a principal trombone computer 113 (i.e., low-brass section leader computer), an assistant trombone computer 613, a principal tuba computer 114, an assistant tuba computer 614, a principal piano computer 115, an assistant principal piano computer 615, a principal harp computer 116, an assistant principal harp computer 616, a principal drum computer 117, an assistant drum computer 617, a principal timpani computer 118 (i.e., percussion section leader computer) and an assistant principal timpani computer 618.

The user (i.e., a musical group leader, conductor, guest conductor, principal first violinist, principal timpani, principal clarinetist) may listen to the musical group from the perspective of an individual player (i.e., a viola da gamba player, a soprano flute player, a tenor oboist). A lead speaker 1105 and a lead speaker 1106 are connected to the lead computer for hearing at least one individual player in a musical group.

A lead computer display screen 1107 may be in the form of a liquid crystal display (LCD), a light-emitting diode display (LED), an active matrix liquid crystal display (AMLCD), a cathode ray tube (CRT), a plasma display panel (PDP), a digital light processing display (DLP), a television screen, a computer monitor, a hand-held (HHC) computer, a personal digital assistant (PDA), a cellular telephone, a tablet PC, a field emission display (FED) or an electro luminescent display (EL). The lead computer display screen 1107 may include one or more view windows for displaying and playing a selected videotaped performance of an individual player, videotaped performances of a plurality of players and/or a selected videotaped performance of the entire musical group. The lead computer display screen 1107 may be coupled to a lead computer processor 1101 (i.e., microprocessor).

A lead computer display screen 1107 may display an icon, radio buttons, menus and/or pull down screen for selecting a musical piece or a repertoire and selecting a videotaped performance of at least one individual player and/or the videotaped performance of at least one musical group leader. Using a lead computer input device 1104 such as a graphical user interface, the musical group leader may select a musical piece or a repertoire. The musical group leader may also select an individual player in the musical group or a combination of individual players in the musical group using the graphical user interface. The lead computer may be interfaced with a lead computer processor 1101 (i.e., a microprocessor), a plurality of player workstations and lead synchronizer 1108. The lead computer possessor 1101 may process the selection for the musical piece and the selection of the videotaped performance of an individual player in the musical group or the videotaped performance of a combination of individual players in the musical group. The lead computer processor 1101 (i.e., microprocessor) may retrieve the selected videotaped performance of an individual player in the musical group or the selected videotaped performance of a combination of individual players in the musical group. A performance of the individual player in the musical group or performances of a combination of individual players may be transmitted via a network 900 to the lead computer.

The audio of the videotaped performances for each selected individual player may be superimposed or synchronized into a superimposed audio performance using the lead synchronizer 1108. The lead computer may play the superimposed audio performance of the selected individual players. Then, the musical group leader can listen to the superimposed audio performance and determine how a musical piece is affected by the selected individual player or selected combination of individual players. Alternatively, a selected videotaped performance of an individual player, selected videotaped performances of a plurality of players and/or a selected videotaped performance of the entire musical group may be displayed and played on one or more view windows of the lead computer display screen 1107.

For example, a conductor may select an individual player (i.e., an individual player) such as a string player using the lead computer input device 1104 on the lead computer and listen to the performance of the string player along with a videotaped recording of the entire musical group to determine how the musical piece is affected by the string player and/or direct the string player to play at a different tempo during a rehearsal. Where a musical group does not have a conductor, a principal first violinist (i.e., a concertmaster or a string section leader) may select a string player using a lead computer input device on the principal first violin computer (i.e., a concertmaster computer or a string section leader computer) and determine how the musical piece is affected by the string player during the rehearsal. A string player includes, but is not limited to a violin player (i.e., an acoustic violinist, an electric violin player), a viola player (a violist), a viol player (i.e., a viola da gamba player, a viola d'amore player, a viola da braccio player), a violoncello player (i.e., a violoncellist, a cellist), a double bass player, a lute player (i.e., a lutenist, a guitarist), a zither player (i.e., a zitherist) and a harp player (i.e., a harpist).

Using the lead computer input device 1104 on the lead computer, the musical group leader may select an individual player such as a woodwind player and play a videotaped performance of the individual player. A woodwind player includes, but is not limited to a piccolo player, a flute player (i.e., a flautist, a fife player, a piccolo flute player, a treble flute player, a soprano flute player, an alto flute player, a tenor flute player, a bass flute player, a contra-alto flute player, a contrabass flute player, a subcontrabass flute player, a double contra-alto flute player, a double contrabass player, a fipple flute player, a transverse flute player such as a Western concert flute player or a Boehm flute, a hyper-bass flute player), an oboe player (i.e., a piccolo oboist, a tenor oboist, an oboe d'amore player, a bass oboist, baritone oboist), a Cor anglais player or an English horn player, a clarinet player (i.e., a sopranino clarinetist, a soprano clarinetist, an alto clarinetist, a contra-alto clarinetist, a contrabass clarinetist, an octocontra-alto clarinetist, an octocontrabass clarinetist, a bass clarinetist, a triple clarinet player), basset horn player, a bassoon player (i.e., a bassoonist, a contrabassoon player), and a saxophone player (i.e., a piccolo saxophonist, a sopranino saxophonist, a soprano saxophonist, a mezzo-soprano saxophonist, an alto saxophonist, a C melody saxophonist, E flat saxophonist, a tenor bass saxophonist, a baritone saxophonist, a bass saxophonist, a contrabass saxophonist, aulochrome saxophonist).

For example, a conductor may select a soprano clarinetist using the lead computer input device 1104 on the conductor computer 101 and listen to the tempo. Then, the conductor may direct the soprano clarinetist to increase or decrease tempo. In still another example, a principal clarinet may select a bass clarinetist using the lead computer input device 1104 on a principal clarinet computer 109, listen to the bass clarinetist to determine how the tone of the musical piece is affected by the bass clarinetist.

Optionally, the musical group leader may select an individual player such as a percussion player using the lead computer input device 1104 on the lead computer and play the videotaped performance of the individual player. A percussion player includes but is not limited to a drum player (i.e., a drummer, a snare drummer, a tenor drummer, a bass drummer), a cymbal player (i.e., cymbalist), a castanet player, an orchestra bell player (i.e., a Glockenspiel bell player, a bell lyre player), a triangle player, a wood block player, tambourine player, a maraca player, a guiro player, a timpani player, a xylophone player, a metallophone player, a marimba player, a marimba-xylophone player, a chime player, a pianist, a harpsichord player and an organist. For example, a percussion section leader may select a cymbal player using a lead computer input device 1104 on the lead computer. The percussion section leader can listen to the cymbal player on the videotaped performance and determine how the musical piece is affected by the cymbal player and watches the demeanor of the cymbal player.

Another alternative is the selection of an individual player such as a brass player by a musical group leader using the lead computer input device 1104 on the lead computer. Then, the lead computer may play the audio performance of the individual player through lead computer speakers 1105 and 1106. A brass player includes, but is not limited to a trumpet player (i.e., a B flat trumpet player, a C trumpet player, a piccolo trumpeter, a bass trumpeter, a slide trumpet player), a cornet player (i.e., a B flat cornetist, an E flat cornetist), a trombone player (i.e., a piccolo trombonist, a soprano trombonist, a sopranino trombonist, an alto trombonist, a tenor trombonist, a bass trombonist, a contrabass trombonist), a tuba player (i.e., a euphonium player or a tenor tuba player such as a small French Tuba, a C tuba player, a B flat tuba player, a bass tuba player such as a F tuba player or an E flat tuba player, a contrabass tuba such as a CC contrabass tuba player or a BB flat contrabass tuba player), a horn player (i.e., a French horn player, a baritone horn player, a flugelhorn player).

The musical group leader may select a plurality of string players, a plurality of woodwind players, a plurality of percussion players, a plurality of brass players, or a combination thereof using a lead computer input device 1104 on the lead computer. For instance, a brass section leader may select a tuba player and trombone player using the lead computer input device 1104 on the principal trumpet computer 112 and listen to how the musical composition is affected by the tuba player and trombone player. Then, the musical group leader may determine that the tuba player's videotaped performance does not blend with a plurality of brass players. Thus, the entire musical group does not have to be assembled for the musical group leader to hear how the musical piece is affected by an individual player.

The musical group leader may select at least one of an individual player and a plurality of string players, a plurality of woodwind players, a plurality of percussion players, a plurality of brass players or a combination thereof using an input device 1104. The performances of the individual player and a plurality of string players, a plurality of woodwind players, a plurality of percussion players, a plurality of brass players or a combination thereof may be transmitted over a network to the lead computer. Then, the videotaped performance of the individual player is played. Then, the musical group leader may listen to a musical piece from a perspective of the selected individual player.

Figure 25:
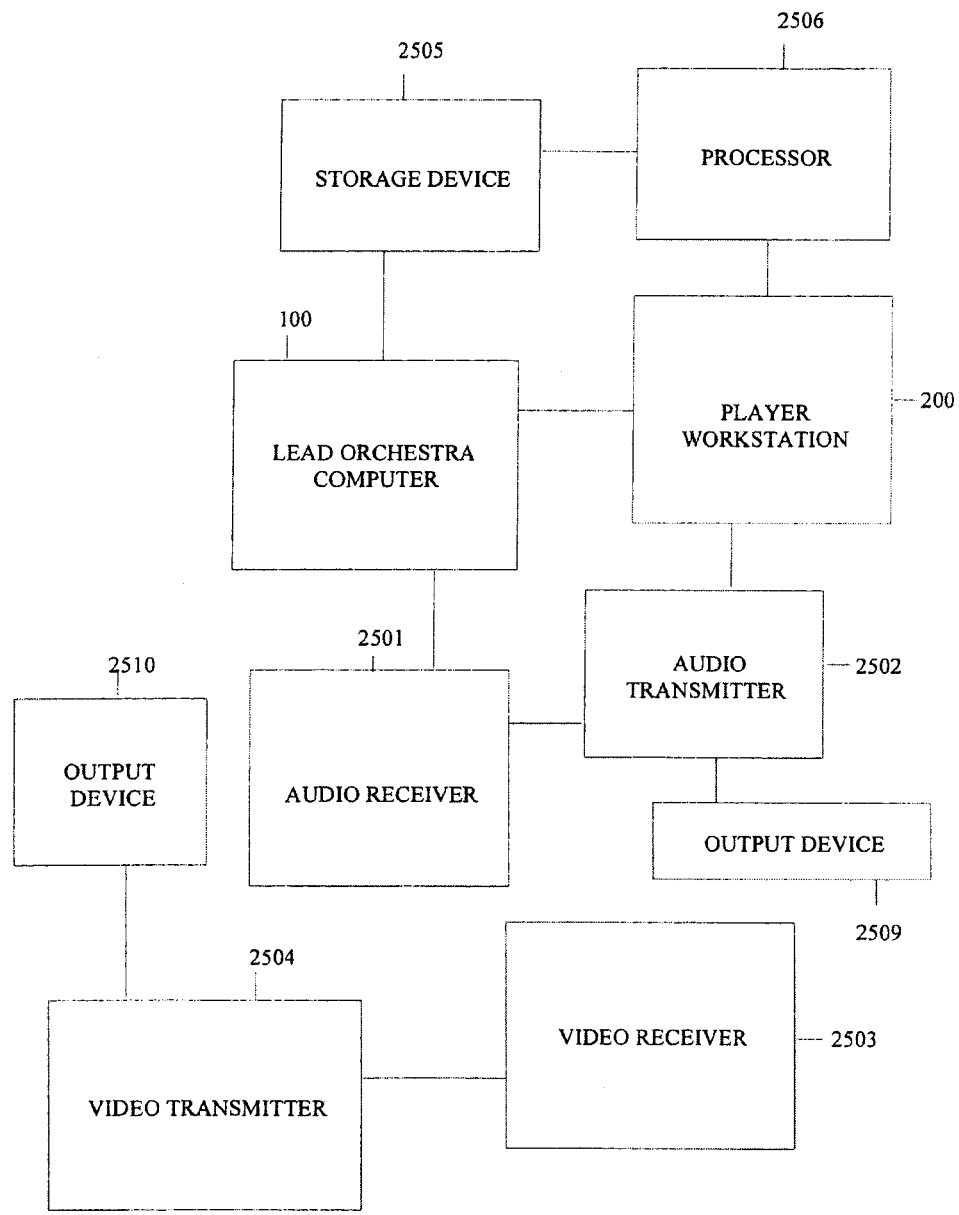
FIG. 25 illustrates a system comprising a plurality of lead computers, a plurality of player workstations, a plurality of audio receivers and transmitters for capturing audio signals and converting the audio signals to a transmittable form, wherein at least one audio receiver and transmitter is associated with each player, a plurality of video receivers and transmitters for capturing images and converting the images to a transmittable form, wherein at least one video receiver and transmitter is associated with each player, a storage device and a processor for receiving and processing signals from the audio and video receivers and transmitters and to filter any distortions of sound by other players in the background and an output device for outputting each audio and video receiver.

In another aspect, FIG. 25 illustrates a simplified example of a system of the present invention. The system includes one or more of lead computers 100 (i.e., a string section leader computer, a concertmaster computer) and one or more player workstations 200 (i.e., first violin player workstation, a second violin player workstation, a viola player workstation). The system also includes one or more audio receivers 2501 and transmitters 2502 for capturing audio signals and converting said audio signals to a transmittable form. At least one audio receiver 2501 and transmitter 2502 is associated with each player. The system includes one or more video receivers 2503 and transmitters 2504 for capturing images and converting the images to a transmittable form. At least one video receiver 2503 and transmitter 2504 is associated with each player. The system includes a storage device 2505 and a processor 2506 for receiving and processing signals from the audio and video receivers and transmitters and to filter any distortions of sound by other players in the background. Further, the system includes one or more output devices 2509 (i.e., speaker) for outputting each audio receiver 2509 and one or more output devices (i.e., display device) for each video receiver 2510.

What is claimed is:

1. A system comprising:
   a plurality of lead computers linked together over a network;
   a plurality of player workstations, each of the plurality of player workstations associated with an individual player of a musical group;
   a plurality of receivers and transmitters for capturing audio signals and converting said audio signals to a transmittable form, wherein at least one of the plurality of receivers and transmitters is associated with at least one of the player workstations;
   a plurality of video receivers and transmitters for capturing images and converting said images to a transmittable form, wherein at least one of the plurality of video receivers and transmitters is associated with at least one of the player workstations;
   a storage device and a processor for receiving and processing signals from said audio and video receivers and transmitters;
   a recorder for storing said transmittable audio signals on the storage device;
   a recorder for storing said transmittable video images on the storage device; and
   an output device for outputting each audio and video receiver;
   wherein each of the plurality of lead computers includes a lead computer processor for processing a selection of a musical piece and a selection of the transmittable audio signals and transmittable images of one or more individual players transmitted over the network to the lead computer;
   wherein each of the lead computers include a display devices having one or more view windows for displaying and playing the selected musical piece alongside the selection of the transmittable audio signals and transmittable images of one or more individual players;
   wherein the selections are at least one of a videotaped performance of an individual player, a videotaped performance of a plurality of players, and a videotaped performance of the entire musical group.

2. The system of claim 1, wherein the display device comprises a graphical user interface.

3. The system of claim 1, wherein the signals associated with individual players are selected from the group consisting of a string player, a woodwind player, a brass player, a percussion player, a vocalist player or a combination thereof.

4. The system of claim 3 wherein the signal associated with said string player is selected from the group consisting of a violin player, a viola player, a viol player, a violoncello player, a double bass player, a lute player, a zither player and a harp player.

5. The system of claim 3 wherein the signal associated with said brass player is selected from the group consisting of a trumpet player, a cornet player, a trombone player, a tuba player, horn player, a baritone horn player, a flugelhorn player.

6. The system of claim 3 wherein the signal associated with said woodwind player is selected from the group consisting of a flute player, a transverse flute player, an oboe player, English horn player, a clarinet player, basset horn player, a bassoon player, a saxophone player.

7. The system of claim 3 wherein the signal associated with said percussion player is selected from the group consisting of a drum player, a cymbal player, a castanet player, an orchestra bell player, a triangle player, a wood block player, tambourine player, a maraca player, a guiro player, a timpani player, a xylophone player, a metallophone player, a marimba player, a marimba-xylophone player, a chime player, a pianist, a harpsichord player and an organist.

8. The system of claim 3 wherein the signal associated with said vocalist player is selected from the group consisting of a soprano player, a mezzo-soprano player, a contralto player, a countertenor player, a tenor player, a baritone player, a bass player, a jazz style player, a rock style player, a pop style player, a blues style player, a country style player, a folk style player.

9. The system of claim 1 wherein said plurality of lead computers is selected from the group consisting of a conductor computer, a principal first violin computer, a principal second violin computer, a principal violoncello computer, a principal double bass computer, a principal viola computer, a principal flute computer, a principal oboe computer, a principal clarinet computer, a principal bassoon computer, a principal horn computer, a principal trumpet computer, a principal trombone computer, a principal tuba computer, a principal piano computer, a principal harp computer, a principal drum computer, a principle lute computer, a principle vocalist computer and a principal timpani computer.

10. The system of claim 1 wherein said plurality of player workstations is selected from the group consisting of a first violin player workstation, a second violin player workstation, a viola player workstation, a violoncello player workstation, a double bass player workstation, a lute player workstation, a zither player workstation, a harp player workstation, a flute player workstation, an oboe player workstation, an English horn player workstation, a clarinet player workstation, a basset horn player workstation, a bassoon player workstation, a saxophone player workstation, a trumpet player workstation, a cornet player workstation, a trombone player workstation, a tuba player workstation, a contrabass tuba player workstation, a horn player workstation, a drum player workstation, a cymbal player workstation, a castanet player workstation, a gong player workstation, an orchestra bell player workstation, a tambourine player workstation, a maraca player workstation, a guiro player workstation, a timpani player workstation, a xylophone player workstation, a metallophone player workstation, a marimba player workstation, a marimba-xylophone player workstation, a chime player workstation, a piano player workstation, a harpsichord player workstation, an organ player workstation, a vocalist player workstation or a combination thereof.

11. The system of claim 1 wherein said plurality of lead computers comprises at least one of an assistant computer.

12. The system of claim 11 wherein said assistant computer is selected from the group consisting of an assistant first violin computer, an assistant principal second violin computer, an assistant principal violoncello computer, an assistant double bass computer, an assistant principal viola computer, an assistant flute computer, an assistant principal oboe computer, an assistant principal clarinet computer, an assistant principal bassoon computer, an assistant principal horn computer, an assistant principal trumpet computer, an assistant trombone computer, an assistant tuba computer, an assistant principal piano computer, an assistant principal harp computer, an assistant drum computer, an assistant principal timpani computer, an assistant principal lute player, an assistant principal vocalist player or combination thereof.

13. A system comprising:
a plurality of lead computers linked together over a network;
a plurality of player workstations, each of the plurality of player workstations associated with an individual player of a musical group;
a player workstation audio and video receivers and transmitters for capturing audio signals and images at a single player workstation of the plurality of player workstations and converting the audio and video signals to a transmittable form, located at a first player workstation of the plurality of player workstations;
a plurality of audio and video receivers and transmitters for capturing audio signals and images at one or more other player workstations of the plurality of workstations and converting the audio and video signals to a transmittable form;
a storage device and a processor for receiving the captured audio and video signals from the single player workstation and the one or more other workstations; and
an output device for outputting a selected playback of the audio and video signals from the storage device;
wherein each of the plurality of lead computers includes a lead computer processor for processing a selection of a musical piece and a selection of the transmittable audio signals and transmittable images of one or more individual players transmitted over the network to the lead computer;
wherein each of the lead computers include a display devices having one or more view windows for displaying and playing the selected musical piece alongside the selection of the transmittable audio signals and transmittable images of one or more individual players;
wherein the selected playback is a performance of the individual player of the musical group associated with the single player workstation that is outputted along with a playback of the one or more other player workstations and transmitted to the plurality of lead computers over the network.

14. The system of claim 13, wherein the performance is a videotaped performance.

15. The system of claim 14, wherein the videotaped performance includes audio and video signals.

16. The system of claim 13, wherein the signals associated with individual players are selected from the group consisting of a string player, a woodwind player, a brass player, a percussion player, a vocalist player or a combination thereof.

17. The system of claim 13 wherein said plurality of lead computers is selected from the group consisting of a conductor computer, a principal first violin computer, a principal second violin computer, a principal violoncello computer, a principal double bass computer, a principal viola computer, a principal flute computer, a principal oboe computer, a principal clarinet computer, a principal bassoon computer, a principal horn computer, a principal trumpet computer, a principal trombone computer, a principal tuba computer, a principal piano computer, a principal harp computer, a principal drum computer, a principle lute computer, a principle vocalist computer and a principal timpani computer.

18. The system of claim 13, wherein said plurality of player workstations is selected from the group consisting of a first violin player workstation, a second violin player workstation, a viola player workstation, a violoncello player workstation, a double bass player workstation, a lute player workstation, a zither player workstation, a harp player workstation, a flute player workstation, an oboe player workstation, an English horn player workstation, a clarinet player workstation, a basset horn player workstation, a bassoon player workstation, a saxophone player workstation, a trumpet player workstation, a cornet player workstation, a trombone player workstation, a tuba player workstation, a contrabass tuba player workstation, a horn player workstation, a drum player workstation, a cymbal player workstation, a castanet player workstation, a gong player workstation, an orchestra bell player workstation, a tambourine player workstation, a maraca player workstation, a guiro player workstation, a timpani player workstation, a xylophone player workstation, a metallophone player workstation, a marimba player workstation, a marimba-xylophone player workstation, a chime player workstation, a piano player workstation, a harpsichord player workstation, an organ player workstation, a vocalist player workstation or a combination thereof.

19. The system of claim 13, wherein said plurality of lead computers comprises at least one of an assistant computer.

20. The system of claim 19 wherein said assistant computer is selected from the group consisting of an assistant first violin computer, an assistant principal second violin computer, an assistant principal violoncello computer, an assistant double bass computer, an assistant principal viola computer, an assistant flute computer, an assistant principal oboe computer, an assistant principal clarinet computer, an assistant principal bassoon computer, an assistant principal horn computer, an assistant principal trumpet computer, an assistant trombone computer, an assistant tuba computer, an assistant principal piano computer, an assistant principal harp computer, an assistant drum computer, an assistant principal timpani computer, an assistant principal lute player, an assistant principal vocalist player or combination thereof.

* * * * *

UNITED STATES PATENT AND TRADEMARK OFFICE
CERTIFICATE OF CORRECTION

| | | |
|---|---|---|
| PATENT NO. | : 8,768,139 B2 | Page 1 of 1 |
| APPLICATION NO. | : 13/169654 | |
| DATED | : July 1, 2014 | |
| INVENTOR(S) | : Keith A. Raniere | |

It is certified that error appears in the above-identified patent and that said Letters Patent is hereby corrected as shown below:

In the Claims

<u>COLUMN 12</u>

Claim 1, line 1, delete "include" and insert -- includes --

Claim 1, line 2, delete "devices" and insert -- device --

<u>COLUMN 13</u>

Claim 13, line 58, delete "include" and insert -- includes --

Claim 13, line 59, delete "devices" and insert -- device --

Signed and Sealed this
Seventh Day of October, 2014

Michelle K. Lee
*Deputy Director of the United States Patent and Trademark Office*